US011243371B2

(12) United States Patent
Jhang et al.

(10) Patent No.: US 11,243,371 B2
(45) Date of Patent: Feb. 8, 2022

(54) OPTICAL IMAGING LENS

(71) Applicant: Genius Electronic Optical (Xiamen) Co., Ltd., Fujian (CN)

(72) Inventors: Jia-Sin Jhang, Taichung (TW); Huifeng Pan, Fujian (CN); Zhao Wang, Fujian (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 316 days.

(21) Appl. No.: 16/435,901

(22) Filed: Jun. 10, 2019

(65) Prior Publication Data

US 2020/0285017 A1    Sep. 10, 2020

(30) Foreign Application Priority Data

Mar. 8, 2019  (CN) .......................... 201910176693.2

(51) Int. Cl.
*G02B 7/02* (2021.01)
*G02B 9/60* (2006.01)
(Continued)

(52) U.S. Cl.
CPC .............. *G02B 7/021* (2013.01); *G02B 9/60* (2013.01); *G02B 9/62* (2013.01); *G02B 13/0045* (2013.01); *H04N 5/2254* (2013.01); *G02B 9/64* (2013.01)

(58) Field of Classification Search
CPC ........ G02B 9/62; G02B 13/0045; G02B 9/60; G02B 9/64; G02B 23/243
See application file for complete search history.

(56) References Cited

U.S. PATENT DOCUMENTS

2017/0227744 A1    8/2017  Sakata

FOREIGN PATENT DOCUMENTS

CN    207601413 U    7/2018
CN    109358405 A    2/2019
(Continued)

OTHER PUBLICATIONS

Machine translation of Ge et al. CN 207601413, retrieved Jun. 15, 2021 from Espacenet (Year: 2021).*

(Continued)

*Primary Examiner* — Cara E Rakowski
(74) *Attorney, Agent, or Firm* — Chen Yoshimura LLP

(57) ABSTRACT

An optical imaging lens may include a first, a second, a third, a fourth and a fifth lens elements positioned in an order from an object side to an image side. Through designing concave and/or convex surfaces of the five lens elements, the optical imaging lens may provide improved imaging quality and optical characteristics, increased focal length of the optical imaging lens, improved assembly yield and reduced size of the imaging lens while the optical imaging lens may satisfy $(T2+G23+T3+G34+T4+G45+T5)/G12 \leq 2.700$, wherein a thickness of the second lens element along the optical axis is represented by T2, a thickness of the third lens element along the optical axis is represented by T3, a thickness of the fourth lens element along the optical axis is represented by T4, a thickness of the fifth lens element along the optical axis is represented by T5, a distance from the image-side surface of the first lens element to the object-side surface of the second lens element along the optical axis is represented by G12, a distance from the image-side surface of the second lens element to the object-side surface of the third lens element along the optical axis is represented by G23, a distance from the image-side surface of the third lens element to the object-side surface of the fourth lens element (Continued)

along the optical axis is represented by G34, and a distance from the image-side surface of the fourth lens element to the object-side surface of the fifth lens element along the optical axis is represented by G45.

20 Claims, 38 Drawing Sheets

(51) Int. Cl.
*H04N 5/225* (2006.01)
*G02B 13/00* (2006.01)
*G02B 9/62* (2006.01)
*G02B 9/64* (2006.01)

(56) References Cited

FOREIGN PATENT DOCUMENTS

| | | |
|---|---|---|
| EP | 0644688 A1 | 3/1995 |
| JP | H07151977 A | 6/1995 |

OTHER PUBLICATIONS

Chinese Office Action, dated Nov. 23, 2020, in a counterpart Chinese patent application, No. CN 201910176693.2.

\* cited by examiner

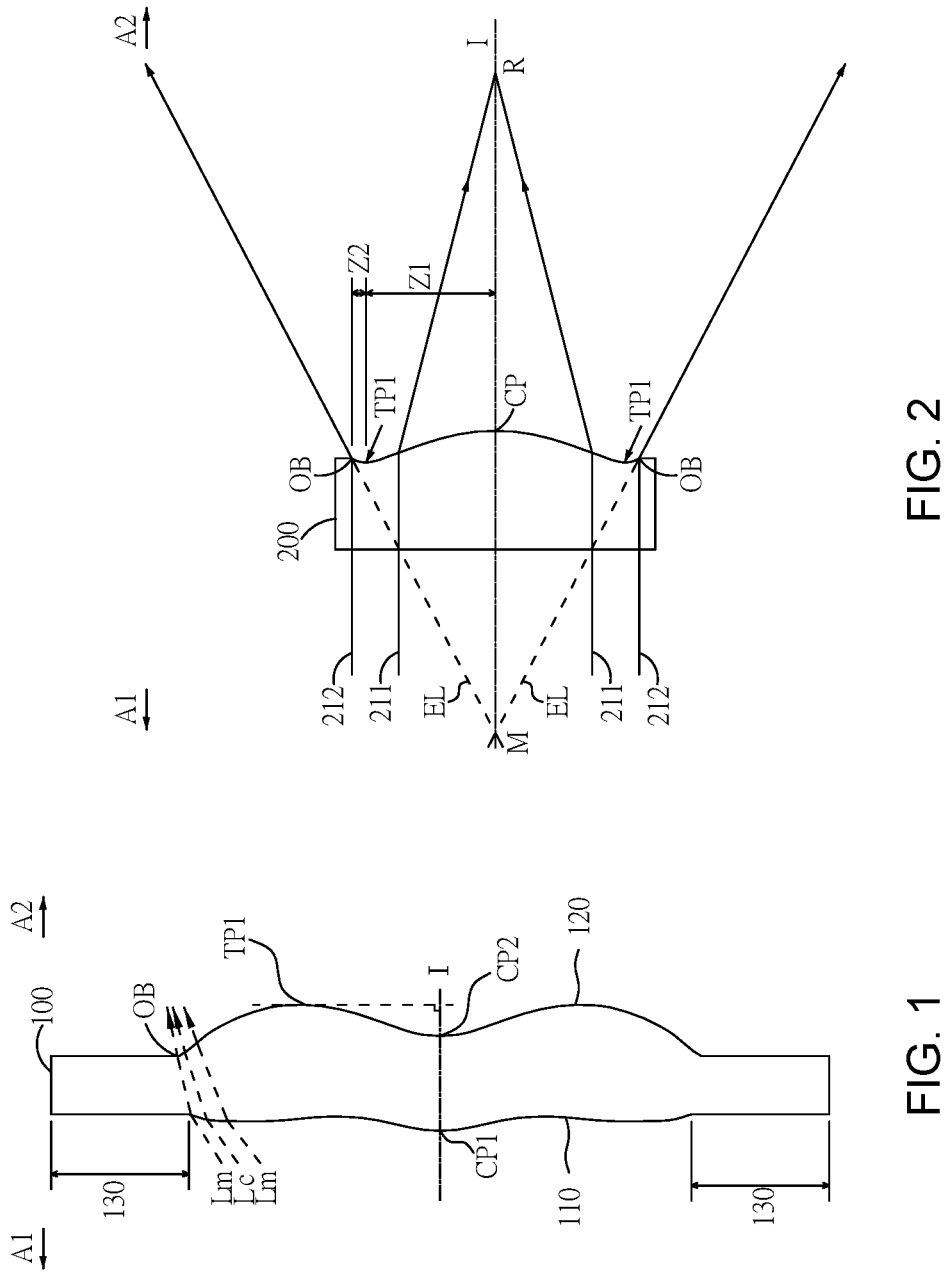

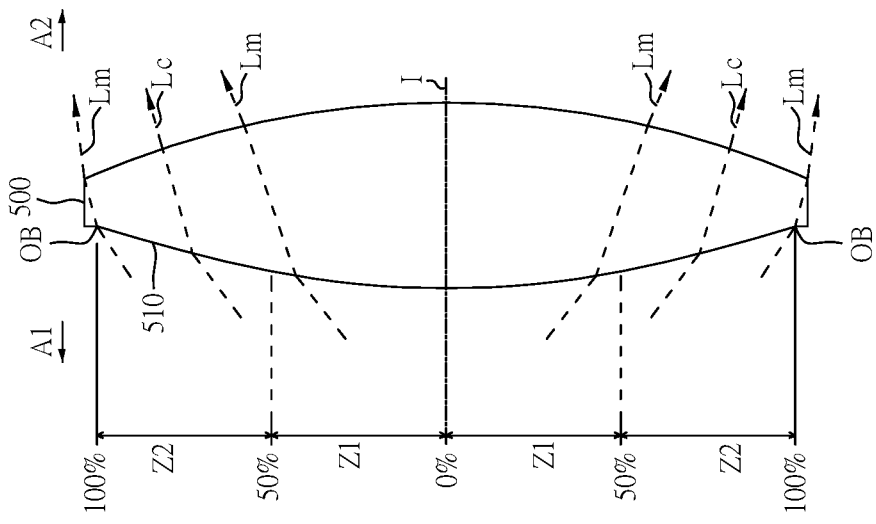
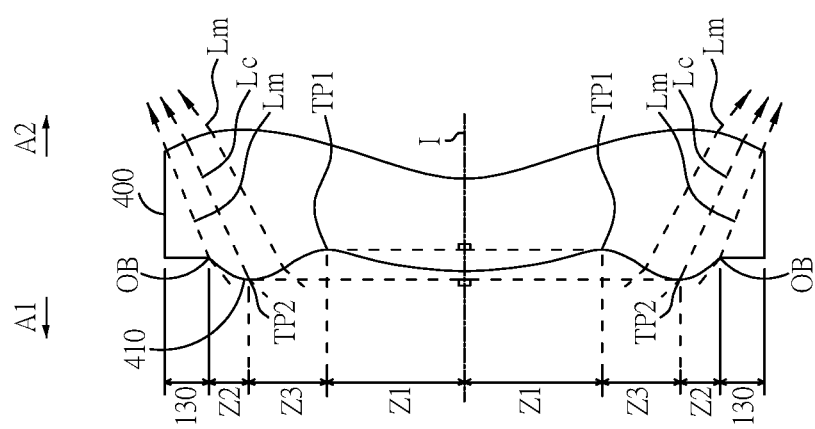
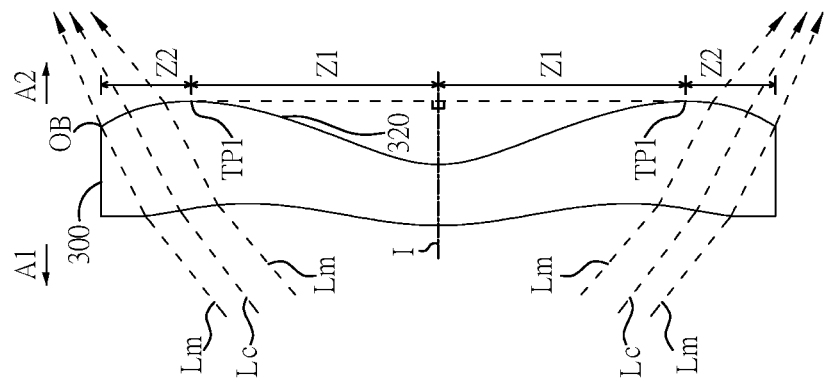

| Embodiment 1 |||||||||
| --- |||||||||
| EFL = 11.799 mm；HFOV = 11.864 dgrees；TTL = 11.209 mm |||||||||
| Fno = 3.150；Image Height = 2.502 mm |||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 2.815 | 1.268 | 1.545 | 55.987 | 1.846 | 7.687 | Plastic |
| L1A2 | | 7.177 | 1.061 | | | 1.635 | | |
| STO | Aperture stop | INFINITY | -0.081 | | | 1.317 | | |
| L2A1 | 2nd lens element | 9.431 | 0.280 | 1.642 | 22.409 | 1.316 | -4.202 | Plastic |
| L2A2 | | 2.086 | 0.119 | | | 1.258 | | |
| L3A1 | 3rd lens element | 2.649 | 1.178 | 1.545 | 55.987 | 1.273 | 4.279 | Plastic |
| L3A2 | | -16.767 | 0.160 | | | 1.257 | | |
| L4A1 | 4th lens element | -8.302 | 0.342 | 1.545 | 55.987 | 1.268 | -4.069 | Plastic |
| L4A2 | | 3.080 | 0.040 | | | 1.378 | | |
| L5A1 | 5th lens element | 3.083 | 0.527 | 1.642 | 22.409 | 1.391 | 5.952 | Plastic |
| L5A2 | | 14.384 | 5.420 | | | 1.417 | | |
| TFA1 | Filtering unit | INFINITY | 0.210 | 1.517 | 64.167 | 2.340 | | |
| TFA2 | | INFINITY | 0.686 | | | 2.364 | | |
| IMA | Image plane | INFINITY | | | | 2.499 | | |

FIG. 8

| Embodiment 1 | | | |
|---|---|---|---|
| Aspherical Parameters | | | |
| Surface # | K | $a_2$ | $a_4$ |
| L1A1 | -1.860151E-02 | 0.000000E+00 | -1.837617E-03 |
| L1A2 | 0.000000E+00 | 0.000000E+00 | -2.148919E-04 |
| L2A1 | 0.000000E+00 | 0.000000E+00 | -1.470144E-03 |
| L2A2 | -5.915592E-02 | 0.000000E+00 | -2.345769E-02 |
| L3A1 | 0.000000E+00 | 0.000000E+00 | -1.982141E-02 |
| L3A2 | 0.000000E+00 | 0.000000E+00 | -2.553651E-03 |
| L4A1 | 0.000000E+00 | 0.000000E+00 | -1.120257E-02 |
| L4A2 | -7.568212E-01 | 0.000000E+00 | -2.037300E-02 |
| L5A1 | 0.000000E+00 | 0.000000E+00 | -0.030144922 |
| L5A2 | 0.000000E+00 | 0.000000E+00 | -0.015261398 |
| Surface # | $a_6$ | $a_8$ | $a_{10}$ |
| L1A1 | -1.804552E-04 | -9.448183E-05 | -3.806090E-06 |
| L1A2 | -6.443496E-04 | -2.725398E-04 | 3.746527E-05 |
| L2A1 | 7.168514E-04 | 6.287513E-04 | -3.278175E-04 |
| L2A2 | 4.570796E-03 | 1.412948E-03 | 1.178517E-03 |
| L3A1 | 9.021976E-03 | 7.296040E-04 | 8.993912E-06 |
| L3A2 | 8.492825E-03 | -3.164307E-03 | -1.548589E-03 |
| L4A1 | -1.187231E-02 | 3.778143E-03 | -2.956417E-03 |
| L4A2 | -9.123862E-03 | 8.860993E-03 | -2.209190E-03 |
| L5A1 | -5.021707E-03 | 7.186210E-03 | -2.554543E-03 |
| L5A2 | -2.792977E-03 | -1.082233E-03 | 1.756178E-03 |
| Surface # | $a_{12}$ | $a_{14}$ | $a_{16}$ |
| L1A1 | -3.521585E-06 | -6.537519E-07 | 1.083467E-08 |
| L1A2 | -2.319515E-05 | 2.052054E-06 | 4.059720E-07 |
| L2A1 | 3.006352E-04 | -8.161228E-05 | -6.740487E-06 |
| L2A2 | -9.806478E-05 | 8.999995E-05 | -1.500778E-04 |
| L3A1 | -3.333095E-04 | 5.963784E-04 | -2.112693E-04 |
| L3A2 | 2.065910E-03 | 3.977767E-04 | 5.643478E-04 |
| L4A1 | 3.010881E-03 | 6.088110E-04 | 1.133942E-05 |
| L4A2 | -2.707420E-04 | 1.300747E-04 | -1.302165E-04 |
| L5A1 | 2.939230E-04 | 2.020381E-05 | -4.07828E-05 |
| L5A2 | -2.639270E-04 | -4.266372E-05 | 1.97308E-05 |

FIG. 9

| Embodiment 2 ||||||||
| :---: | :---: | :---: | :---: | :---: | :---: | :---: | :---: | :---: |
| EFL = 14.567 mm ; HFOV = 9.759 dgrees ; TTL = 13.137 mm ||||||||
| Fno = 4.468 ; Image Height = 2.502 mm ||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 4.061 | 1.696 | 1.545 | 55.987 | 1.630 | 9.195 | Plastic |
| L1A2 | | 18.065 | 0.133 | | | 1.385 | | |
| STO | Aperture stop | INFINITY | 1.918 | | | 1.366 | | |
| L2A1 | 2nd lens element | 19.173 | 0.250 | 1.642 | 22.409 | 1.309 | -3.753 | Plastic |
| L2A2 | | 2.145 | 0.068 | | | 1.274 | | |
| L3A1 | 3rd lens element | 2.123 | 0.922 | 1.545 | 55.987 | 1.348 | 3.775 | Plastic |
| L3A2 | | -60.482 | 0.769 | | | 1.334 | | |
| L4A1 | 4th lens element | -6.053 | 0.250 | 1.545 | 55.987 | 1.278 | -3.167 | Plastic |
| L4A2 | | 2.458 | 0.134 | | | 1.455 | | |
| L5A1 | 5th lens element | 2.867 | 0.614 | 1.642 | 22.409 | 1.538 | 4.455 | Plastic |
| L5A2 | | 456.671 | 5.420 | | | 1.564 | | |
| TFA1 | Filtering unit | INFINITY | 0.210 | 1.517 | 64.167 | 2.389 | | |
| TFA2 | | INFINITY | 0.754 | | | 2.410 | | |
| IMA | Image plane | INFINITY | | | | 2.525 | | |

FIG. 12

| Embodiment 2 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -1.728779E-03 | 8.022496E-05 |
| L1A2 | 0.000000E+00 | 0.000000E+00 | -3.000699E-03 | 1.475743E-03 |
| L2A1 | 0.000000E+00 | 0.000000E+00 | -5.584624E-03 | 4.528142E-03 |
| L2A2 | 0.000000E+00 | 0.000000E+00 | -1.768522E-02 | 7.281157E-03 |
| L3A1 | 0.000000E+00 | 0.000000E+00 | -7.378740E-03 | 3.670903E-03 |
| L3A2 | 0.000000E+00 | 0.000000E+00 | -6.483754E-05 | 9.574916E-03 |
| L4A1 | 0.000000E+00 | 0.000000E+00 | -3.395005E-02 | -3.446170E-03 |
| L4A2 | 0.000000E+00 | 0.000000E+00 | -3.578150E-02 | -2.207534E-02 |
| L5A1 | 0.000000E+00 | 0.000000E+00 | -2.691708E-02 | -9.611619E-03 |
| L5A2 | 0.000000E+00 | 0.000000E+00 | -1.900000E-02 | 3.553963E-03 |
| Surface # | $a_8$ | $a_{10}$ | $a_{12}$ | |
| L1A1 | -6.802775E-06 | -4.107976E-05 | 9.278767E-06 | |
| L1A2 | -1.130807E-03 | 3.928802E-04 | -5.166240E-05 | |
| L2A1 | 1.439699E-03 | -1.503601E-03 | 3.896348E-04 | |
| L2A2 | -3.963220E-04 | 1.003042E-03 | -5.578830E-04 | |
| L3A1 | 2.083304E-03 | -3.883449E-04 | -4.674461E-04 | |
| L3A2 | -5.295733E-03 | 7.476714E-05 | -2.687378E-04 | |
| L4A1 | -6.763527E-03 | -1.425246E-03 | 7.059376E-04 | |
| L4A2 | 9.187376E-03 | -1.418154E-03 | 5.115373E-05 | |
| L5A1 | 7.352674E-03 | -1.249467E-03 | -2.889132E-05 | |
| L5A2 | -1.157547E-03 | 1.467998E-03 | -3.286555E-04 | |

FIG. 13

| Embodiment 3 ||||||||
| --- | --- | --- | --- | --- | --- | --- | --- | --- |
| EFL = 14.522 mm ; HFOV = 9.759 dgrees ; TTL = 12.961 mm ||||||||
| Fno = 4.694 ; Image Height = 2.502 mm ||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 3.601 | 1.093 | 1.545 | 55.987 | 1.519 | 8.793 | Plastic |
| L1A2 | | 12.851 | 0.088 | | | 1.372 | | |
| STO | Aperture stop | INFINITY | 1.625 | | | 1.366 | | |
| L2A1 | 2nd lens element | 17.258 | 0.972 | 1.642 | 22.409 | 1.296 | -3.906 | Plastic |
| L2A2 | | 2.157 | 0.040 | | | 1.244 | | |
| L3A1 | 3rd lens element | 2.302 | 1.247 | 1.545 | 55.987 | 1.269 | 3.935 | Plastic |
| L3A2 | | -26.362 | 0.501 | | | 1.261 | | |
| L4A1 | 4th lens element | -6.384 | 0.290 | 1.545 | 55.987 | 1.214 | -3.209 | Plastic |
| L4A2 | | 2.455 | 0.040 | | | 1.384 | | |
| L5A1 | 5th lens element | 2.805 | 0.768 | 1.642 | 22.409 | 1.418 | 4.626 | Plastic |
| L5A2 | | 39.515 | 5.420 | | | 1.470 | | |
| TFA1 | Filtering unit | INFINITY | 0.210 | 1.517 | 64.167 | 2.370 | | |
| TFA2 | | INFINITY | 0.669 | | | 2.392 | | |
| IMA | Image plane | INFINITY | | | | 2.503 | | |

FIG. 16

| Embodiment 3 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -2.185702E-03 | -2.263981E-04 |
| L1A2 | 0.000000E+00 | 0.000000E+00 | -3.913066E-03 | 1.181203E-03 |
| L2A1 | 0.000000E+00 | 0.000000E+00 | -8.179509E-03 | 2.283489E-03 |
| L2A2 | 0.000000E+00 | 0.000000E+00 | -2.848096E-02 | 7.837386E-03 |
| L3A1 | 0.000000E+00 | 0.000000E+00 | -1.275790E-02 | 4.532999E-03 |
| L3A2 | 0.000000E+00 | 0.000000E+00 | -3.288336E-03 | 6.431408E-03 |
| L4A1 | 0.000000E+00 | 0.000000E+00 | -4.160850E-02 | -4.526123E-03 |
| L4A2 | 0.000000E+00 | 0.000000E+00 | -3.011501E-02 | -2.111323E-02 |
| L5A1 | 0.000000E+00 | 0.000000E+00 | -2.493309E-02 | -9.210204E-03 |
| L5A2 | 0.000000E+00 | 0.000000E+00 | -2.261034E-02 | 4.658092E-03 |
| Surface # | $a_8$ | $a_{10}$ | $a_{12}$ | |
| L1A1 | 4.498443E-05 | -4.516520E-05 | 4.533511E-06 | |
| L1A2 | -1.071192E-03 | 4.199174E-04 | -7.441930E-05 | |
| L2A1 | 8.168870E-04 | -9.037170E-04 | 2.316380E-04 | |
| L2A2 | -4.605030E-04 | 1.822286E-03 | -1.013600E-03 | |
| L3A1 | 3.880672E-03 | -4.650276E-05 | -9.612501E-04 | |
| L3A2 | -5.227525E-03 | -2.304874E-04 | -8.067174E-04 | |
| L4A1 | -7.629076E-03 | -1.471144E-03 | -1.361891E-04 | |
| L4A2 | 6.112061E-03 | -9.256025E-04 | 2.624560E-04 | |
| L5A1 | 6.326601E-03 | -1.012593E-03 | -5.982975E-05 | |
| L5A2 | -7.244920E-04 | 1.482999E-03 | -4.399949E-04 | |

FIG. 17

| Embodiment 4 ||||||||| 
| EFL = 14.592 mm ; HFOV = 9.759 dgrees ; TTL = 12.868 mm ||||||||| 
| Fno = 4.637 ; Image Height = 2.502 mm ||||||||| 
| Surface # | | Radius (mm) | Thickness /air gap (mm) | Refractive index | Abbe number | Effective radius (mm) | Focal length (mm) | Material |
|---|---|---|---|---|---|---|---|---|
| OBJ | Object | INFINITY | INFINITY | | | | | |
| L1A1 | 1st lens element | 3.461 | 1.148 | 1.545 | 55.987 | 1.542 | 8.522 | Plastic |
| L1A2 | | 11.914 | 0.127 | | | 1.380 | | |
| STO | Aperture stop | INFINITY | 1.646 | | | 1.366 | | |
| L2A1 | 2nd lens element | 20.901 | 0.701 | 1.642 | 22.409 | 1.282 | -3.804 | Plastic |
| L2A2 | | 2.174 | 0.040 | | | 1.237 | | |
| L3A1 | 3rd lens element | 2.312 | 1.148 | 1.545 | 55.987 | 1.263 | 3.959 | Plastic |
| L3A2 | | -27.526 | 0.551 | | | 1.267 | | |
| L4A1 | 4th lens element | -6.469 | 0.315 | 1.545 | 55.987 | 1.211 | -3.186 | Plastic |
| L4A2 | | 2.422 | 0.040 | | | 1.385 | | |
| L5A1 | 5th lens element | 2.829 | 0.854 | 1.642 | 22.409 | 1.414 | 4.541 | Plastic |
| L5A2 | | 66.467 | 5.420 | | | 1.483 | | |
| TFA1 | Filtering unit | INFINITY | 0.210 | 1.517 | 64.167 | 2.364 | | |
| TFA2 | | INFINITY | 0.669 | | | 2.386 | | |
| IMA | Image plane | INFINITY | | | | 2.501 | | |

FIG. 20

| Embodiment 4 ||||
|---|---|---|---|
| Aspherical Parameters ||||
| Surface # | K | $a_2$ | $a_4$ | $a_6$ |
| L1A1 | 0.000000E+00 | 0.000000E+00 | -2.154396E-03 | -1.890490E-04 |
| L1A2 | 0.000000E+00 | 0.000000E+00 | -3.771901E-03 | 8.145718E-04 |
| L2A1 | 0.000000E+00 | 0.000000E+00 | -9.777916E-03 | 2.575504E-03 |
| L2A2 | 0.000000E+00 | 0.000000E+00 | -2.878980E-02 | 7.656502E-03 |
| L3A1 | 0.000000E+00 | 0.000000E+00 | -1.190358E-02 | 3.334322E-03 |
| L3A2 | 0.000000E+00 | 0.000000E+00 | -3.512971E-03 | 7.862722E-03 |
| L4A1 | 0.000000E+00 | 0.000000E+00 | -3.943283E-02 | -5.055709E-03 |
| L4A2 | 0.000000E+00 | 0.000000E+00 | -3.060583E-02 | -2.199489E-02 |
| L5A1 | 0.000000E+00 | 0.000000E+00 | -2.599154E-02 | -9.086039E-03 |
| L5A2 | 0.000000E+00 | 0.000000E+00 | -2.239244E-02 | 4.512690E-03 |
| Surface # | $a_8$ | $a_{10}$ | $a_{12}$ | |
| L1A1 | 5.807573E-05 | -7.156170E-05 | 1.134758E-05 | |
| L1A2 | -4.877885E-04 | 4.488165E-05 | 7.626957E-06 | |
| L2A1 | 1.255497E-03 | -8.263383E-04 | 1.539618E-04 | |
| L2A2 | -1.127348E-04 | 2.236486E-03 | -9.511794E-04 | |
| L3A1 | 4.140009E-03 | 1.406009E-04 | -1.026123E-03 | |
| L3A2 | -6.658219E-03 | -2.539948E-04 | -6.650855E-04 | |
| L4A1 | -9.294754E-03 | -1.622465E-03 | 6.510513E-04 | |
| L4A2 | 6.095341E-03 | -5.154198E-04 | 1.786324E-04 | |
| L5A1 | 6.725880E-03 | -1.090226E-03 | -9.799776E-05 | |
| L5A2 | -8.066426E-04 | 1.511171E-03 | -4.573068E-04 | |

FIG. 21

| Embodiment 5 |||||||||
|---|---|---|---|---|---|---|---|---|
| EFL = 14.550 mm ; HFOV = 9.759 dgrees ; TTL = 13.109 mm |||||||||
| Fno = 3.648 ; ImageHeight = 2.502 mm |||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 3.342 | 1.554 | 1.545 | 55.987 | 2.033 | 8.719 | Plastic |
| L1A2 | | 9.358 | 1.317 | | | 1.720 | | |
| STO | Aperture stop | INFINITY | 0.104 | | | 1.366 | | |
| L2A1 | 2nd lens element | 24.492 | 0.876 | 1.642 | 22.409 | 1.359 | -3.891 | Plastic |
| L2A2 | | 2.252 | 0.040 | | | 1.292 | | |
| L3A1 | 3rd lens element | 2.332 | 1.277 | 1.545 | 55.987 | 1.336 | 4.127 | Plastic |
| L3A2 | | -54.386 | 0.355 | | | 1.266 | | |
| L4A1 | 4th lens element | -6.235 | 0.574 | 1.545 | 55.987 | 1.236 | -3.554 | Plastic |
| L4A2 | | 2.911 | 0.040 | | | 1.417 | | |
| L5A1 | 5th lens element | 3.164 | 0.676 | 1.642 | 22.409 | 1.437 | 5.041 | Plastic |
| L5A2 | | 95.682 | 5.420 | | | 1.490 | | |
| TFA1 | Filtering unit | INFINITY | 0.210 | 1.517 | 64.167 | 2.366 | | |
| TFA2 | | INFINITY | 0.669 | | | 2.387 | | |
| IMA | Image plane | INFINITY | | | | 2.503 | | |

FIG. 24

| Embodiment 5 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -3.612200E-04 | 1.100069E-04 |
| L1A2 | 0.000000E+00 | 0.000000E+00 | 1.032213E-03 | 2.857753E-04 |
| L2A1 | 0.000000E+00 | 0.000000E+00 | -3.540428E-03 | -1.772932E-03 |
| L2A2 | 0.000000E+00 | 0.000000E+00 | -2.696680E-02 | 7.368052E-03 |
| L3A1 | 0.000000E+00 | 0.000000E+00 | -1.631716E-02 | 1.070678E-02 |
| L3A2 | 0.000000E+00 | 0.000000E+00 | -1.974958E-03 | 9.264904E-03 |
| L4A1 | 0.000000E+00 | 0.000000E+00 | -2.305216E-02 | -1.089941E-02 |
| L4A2 | 0.000000E+00 | 0.000000E+00 | -2.306463E-02 | -1.275897E-02 |
| L5A1 | 0.000000E+00 | 0.000000E+00 | -2.985126E-02 | -4.970637E-03 |
| L5A2 | 0.000000E+00 | 0.000000E+00 | -1.953194E-02 | 1.353034E-03 |
| Surface # | $a_8$ | $a_{10}$ | $a_{12}$ | |
| L1A1 | -2.259110E-06 | -3.778946E-06 | 1.414856E-06 | |
| L1A2 | 9.014220E-06 | 8.353843E-06 | 3.042644E-06 | |
| L2A1 | 3.025233E-03 | -1.152307E-03 | 1.806305E-04 | |
| L2A2 | 1.309436E-03 | 3.836343E-04 | -2.113358E-04 | |
| L3A1 | 1.745916E-03 | -9.776638E-04 | 2.467601E-04 | |
| L3A2 | -6.822069E-03 | -1.298787E-03 | 3.844267E-04 | |
| L4A1 | -1.905802E-03 | -4.848181E-03 | 1.055571E-03 | |
| L4A2 | 6.295736E-03 | -1.765103E-03 | 1.843704E-04 | |
| L5A1 | 8.510751E-03 | -2.657930E-03 | 1.148135E-04 | |
| L5A2 | 5.673643E-04 | 9.751445E-04 | -3.527578E-04 | |

FIG. 25

| Embodiment 6 ||||||||
|---|---|---|---|---|---|---|---|---|
| EFL = 14.531 mm ; HFOV = 9.759 dgrees ; TTL = 13.120 mm ||||||||
| Fno = 3.524 ; Image Height = 2.502 mm ||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 3.353 | 1.738 | 1.545 | 55.987 | 2.156 | 8.418 | Plastic |
| L1A2 | | 10.107 | 1.300 | | | 1.758 | | |
| STO | Aperture stop | INFINITY | 0.069 | | | 1.366 | | |
| L2A1 | 2nd lens element | 43.526 | 0.658 | 1.642 | 22.409 | 1.360 | -3.793 | Plastic |
| L2A2 | | 2.311 | 0.040 | | | 1.306 | | |
| L3A1 | 3rd lens element | 2.194 | 0.962 | 1.545 | 55.987 | 1.352 | 3.936 | Plastic |
| L3A2 | | -92.212 | 0.334 | | | 1.263 | | |
| L4A1 | 4th lens element | -6.416 | 0.362 | 1.545 | 55.987 | 1.259 | -3.494 | Plastic |
| L4A2 | | 2.771 | 0.317 | | | 1.400 | | |
| L5A1 | 5th lens element | 3.679 | 0.541 | 1.642 | 22.409 | 1.497 | 5.275 | Plastic |
| L5A2 | | -44.793 | 5.420 | | | 1.526 | | |
| TFA1 | Filtering unit | INFINITY | 0.210 | 1.517 | 64.167 | 2.275 | | |
| TFA2 | | INFINITY | 1.169 | | | 2.294 | | |
| IMA | Image plane | INFINITY | | | | 2.497 | | |

FIG. 28

| Embodiment 6 ||||
|---|---|---|---|---|
| Aspherical Parameters |||||
| Surface # | K | $a_2$ | $a_4$ | $a_6$ |
| L1A1 | 0.000000E+00 | 0.000000E+00 | -3.854691E-04 | -7.086595E-05 |
| L1A2 | 0.000000E+00 | 0.000000E+00 | -1.909357E-03 | 8.649342E-04 |
| L2A1 | 0.000000E+00 | 0.000000E+00 | -7.857356E-03 | -1.269822E-03 |
| L2A2 | 0.000000E+00 | 0.000000E+00 | -1.744398E-02 | 4.854080E-03 |
| L3A1 | 0.000000E+00 | 0.000000E+00 | -1.603849E-02 | 1.136691E-02 |
| L3A2 | 0.000000E+00 | 0.000000E+00 | -1.654254E-03 | 9.604914E-03 |
| L4A1 | 0.000000E+00 | 0.000000E+00 | -4.551977E-03 | -1.269809E-02 |
| L4A2 | 0.000000E+00 | 0.000000E+00 | -2.798289E-02 | -1.094939E-02 |
| L5A1 | 0.000000E+00 | 0.000000E+00 | -3.042285E-02 | -6.332682E-03 |
| L5A2 | 0.000000E+00 | 0.000000E+00 | -1.637116E-02 | -9.911823E-04 |
| Surface # | $a_8$ | $a_{10}$ | $a_{12}$ | |
| L1A1 | 8.886501E-05 | -2.541508E-05 | 3.939245E-06 | |
| L1A2 | -5.240532E-05 | -4.036680E-06 | 1.442648E-05 | |
| L2A1 | 2.952672E-03 | -9.977650E-04 | 1.735162E-04 | |
| L2A2 | 1.914461E-04 | 1.053908E-03 | -1.013707E-03 | |
| L3A1 | 2.001186E-03 | -1.231199E-04 | -2.549873E-04 | |
| L3A2 | 2.783377E-03 | -5.772811E-03 | 3.807126E-03 | |
| L4A1 | -5.249434E-03 | -2.179802E-03 | 2.113339E-03 | |
| L4A2 | 7.376662E-03 | -2.979776E-03 | 2.020788E-04 | |
| L5A1 | 1.284437E-02 | -3.195896E-03 | -1.347472E-04 | |
| L5A2 | 1.726029E-04 | 2.990846E-03 | -9.575127E-04 | |

FIG. 29

| Embodiment 7 | | | | | | | | |
|---|---|---|---|---|---|---|---|---|
| EFL = 15.286 mm ; HFOV = 9.329 dgrees ; TTL = 14.522 mm | | | | | | | | |
| Fno = 3.500 ; Image Height = 2.502 mm | | | | | | | | |
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 3.222 | 1.001 | 1.545 | 55.987 | 2.176 | 9.167 | Plastic |
| L1A2 | | 8.044 | 1.658 | | | 2.034 | | |
| STO | Aperture stop | INFINITY | 0.250 | | | 1.549 | | |
| L2A1 | 2nd lens element | -11.732 | 0.540 | 1.642 | 22.409 | 1.530 | -5.441 | Plastic |
| L2A2 | | 5.124 | 0.040 | | | 1.484 | | |
| L3A1 | 3rd lens element | 4.053 | 3.303 | 1.545 | 55.987 | 1.497 | 4.834 | Plastic |
| L3A2 | | -5.397 | 0.114 | | | 1.554 | | |
| L4A1 | 4th lens element | -5.516 | 0.642 | 1.545 | 55.987 | 1.520 | -3.793 | Plastic |
| L4A2 | | 3.455 | 0.040 | | | 1.653 | | |
| L5A1 | 5th lens element | 3.172 | 0.472 | 1.642 | 22.409 | 1.656 | 7.936 | Plastic |
| L5A2 | | 7.808 | 5.420 | | | 1.685 | | |
| TFA1 | Filtering unit | INFINITY | 0.210 | 1.517 | 64.167 | 2.377 | | |
| TFA2 | | INFINITY | 0.831 | | | 2.394 | | |
| IMA | Image plane | INFINITY | | | | 2.502 | | |

FIG. 32

| Embodiment 7 ||||
|---|---|---|---|
| Aspherical Parameters ||||
| Surface # | K | $a_2$ | $a_4$ | $a_6$ |
| L1A1 | 0.000000E+00 | 0.000000E+00 | -4.515812E-04 | 1.490279E-04 |
| L1A2 | 0.000000E+00 | 0.000000E+00 | 4.137007E-04 | -1.783582E-04 |
| L2A1 | 0.000000E+00 | 0.000000E+00 | 3.367412E-03 | -1.823962E-03 |
| L2A2 | 0.000000E+00 | 0.000000E+00 | -2.335739E-02 | 4.515312E-03 |
| L3A1 | 0.000000E+00 | 0.000000E+00 | -3.203880E-02 | 1.060292E-03 |
| L3A2 | 0.000000E+00 | 0.000000E+00 | 1.675753E-02 | -5.852599E-06 |
| L4A1 | 0.000000E+00 | 0.000000E+00 | 9.600605E-03 | -4.585890E-03 |
| L4A2 | 0.000000E+00 | 0.000000E+00 | -2.691575E-02 | -6.540371E-03 |
| L5A1 | 0.000000E+00 | 0.000000E+00 | -3.584615E-02 | -4.773568E-03 |
| L5A2 | 0.000000E+00 | 0.000000E+00 | -1.840077E-02 | 3.531017E-04 |
| Surface # | $a_8$ | $a_{10}$ | $a_{12}$ | |
| L1A1 | -5.770471E-05 | -8.423299E-07 | 1.474398E-06 | |
| L1A2 | -2.807269E-05 | 1.393323E-05 | 9.752031E-08 | |
| L2A1 | 1.338970E-03 | 2.342044E-06 | -4.927670E-05 | |
| L2A2 | 7.485808E-05 | 1.798118E-03 | -2.892807E-04 | |
| L3A1 | 3.200237E-03 | 1.565911E-05 | 1.369511E-05 | |
| L3A2 | -2.848621E-03 | -3.401991E-03 | 1.055026E-03 | |
| L4A1 | 2.305523E-03 | -7.052147E-03 | 1.830896E-03 | |
| L4A2 | 1.014275E-02 | -3.393099E-03 | 1.943160E-04 | |
| L5A1 | 7.478713E-03 | -1.496766E-03 | -1.279959E-04 | |
| L5A2 | -8.880866E-04 | 9.905493E-04 | -2.013498E-04 | |

FIG. 33

| Embodiment 8 |||||||||
| :---: | :---: | :---: | :---: | :---: | :---: | :---: | :---: | :---: |
| EFL = 14.467 mm ; HFOV = 9.759 dgrees ; TTL = 12.701 mm |||||||||
| Fno = 3.345 ; Image Height = 2.502 mm |||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 3.123 | 1.629 | 1.545 | 55.913 | 2.212 | 7.836 | Plastic |
| L1A2 | | 9.395 | 1.442 | | | 1.884 | | |
| STO | Aperture stop | INFINITY | 0.043 | | | 1.366 | | |
| L2A1 | 2nd lens element | 263.521 | 0.380 | 1.645 | 22.478 | 1.363 | -3.530 | Plastic |
| L2A2 | | 2.273 | 0.040 | | | 1.335 | | |
| L3A1 | 3rd lens element | 2.284 | 1.305 | 1.545 | 55.913 | 1.381 | 4.261 | Plastic |
| L3A2 | | 94.038 | 0.439 | | | 1.277 | | |
| L4A1 | 4th lens element | -5.103 | 0.482 | 1.545 | 55.913 | 1.265 | -3.493 | Plastic |
| L4A2 | | 3.153 | 0.040 | | | 1.446 | | |
| L5A1 | 5th lens element | 3.120 | 0.600 | 1.645 | 22.478 | 1.471 | 4.589 | Plastic |
| L5A2 | | -62.521 | 5.420 | | | 1.510 | | |
| TFA1 | Filtering unit | INFINITY | 0.210 | 1.517 | 64.167 | 2.364 | | |
| TFA2 | | INFINITY | 0.672 | | | 2.386 | | |
| IMA | Image plane | INFINITY | | | | 2.507 | | |

FIG. 36

| Embodiment 8 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -2.168651E-04 | 1.006556E-04 |
| L1A2 | 0.000000E+00 | 0.000000E+00 | 1.822824E-03 | 1.091628E-04 |
| L2A1 | 0.000000E+00 | 0.000000E+00 | -6.861058E-03 | -7.832358E-04 |
| L2A2 | 0.000000E+00 | 0.000000E+00 | -2.522868E-02 | 3.510130E-03 |
| L3A1 | 0.000000E+00 | 0.000000E+00 | -1.655411E-02 | 8.105256E-03 |
| L3A2 | 0.000000E+00 | 0.000000E+00 | -4.972826E-03 | 8.469609E-03 |
| L4A1 | 0.000000E+00 | 0.000000E+00 | -2.128338E-02 | -1.235302E-02 |
| L4A2 | 0.000000E+00 | 0.000000E+00 | -2.523261E-02 | -1.193932E-02 |
| L5A1 | 0.000000E+00 | 0.000000E+00 | -3.366862E-02 | -3.031808E-03 |
| L5A2 | 0.000000E+00 | 0.000000E+00 | -1.786163E-02 | 2.536112E-03 |
| Surface # | $a_8$ | $a_{10}$ | $a_{12}$ | |
| L1A1 | -6.843024E-06 | 4.535198E-07 | -9.312668E-08 | |
| L1A2 | -1.014990E-05 | -5.584862E-06 | -2.110056E-07 | |
| L2A1 | 6.863128E-04 | -1.496105E-04 | -2.948568E-05 | |
| L2A2 | 1.478519E-03 | 1.185738E-03 | -9.704346E-04 | |
| L3A1 | 2.717283E-03 | -3.159521E-04 | -2.741792E-04 | |
| L3A2 | -1.466891E-03 | -2.854578E-03 | 2.162251E-03 | |
| L4A1 | 3.305188E-03 | -4.747981E-03 | 1.961444E-03 | |
| L4A2 | 9.470435E-03 | -2.682130E-03 | 1.288593E-04 | |
| L5A1 | 7.808024E-03 | -2.297474E-03 | 6.286931E-07 | |
| L5A2 | -9.978584E-04 | 1.351451E-03 | -3.899525E-04 | |

FIG. 37

| Embodiment 9 |||||||||
|---|---|---|---|---|---|---|---|---|
| EFL = 14.399 mm ; HFOV = 9.759 dgrees ; TTL = 13.152 mm |||||||||
| Fno = 3.492 ; Image Height = 2.502 mm |||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 3.341 | 1.625 | 1.545 | 55.987 | 2.100 | 7.849 | Plastic |
| L1A2 | | 12.530 | 1.301 | | | 1.770 | | |
| STO | Aperture stop | INFINITY | 0.100 | | | 1.366 | | |
| L2A1 | 2nd lens element | 37.805 | 0.479 | 1.642 | 22.409 | 1.356 | -3.586 | Plastic |
| L2A2 | | 2.176 | 0.040 | | | 1.303 | | |
| L3A1 | 3rd lens element | 2.303 | 1.309 | 1.545 | 55.987 | 1.336 | 4.382 | Plastic |
| L3A2 | | 48.731 | 0.382 | | | 1.249 | | |
| L4A1 | 4th lens element | -4.824 | 0.293 | 1.545 | 55.987 | 1.242 | -3.273 | Plastic |
| L4A2 | | 2.902 | 0.040 | | | 1.406 | | |
| L5A1 | 5th lens element | 3.188 | 0.674 | 1.642 | 22.409 | 1.427 | 4.834 | Plastic |
| L5A2 | | -156.150 | 0.105 | | | 1.478 | | |
| L6A1 | 6th lens element | 9.226 | 0.444 | 1.545 | 55.987 | 1.551 | 24.486 | Plastic |
| L6A2 | | 29.234 | 5.420 | | | 1.568 | | |
| TFA1 | Filtering unit | INFINITY | 0.210 | 1.517 | 64.167 | 2.382 | | |
| TFA2 | | INFINITY | 0.732 | | | 2.403 | | |
| IMA | Image plane | INFINITY | | | | 2.514 | | |

FIG. 40

| Embodiment 9 ||||
|---|---|---|---|---|
| Aspherical Parameters |||||
| Surface # | K | $a_2$ | $a_4$ | $a_6$ |
| L1A1 | 0.000000E+00 | 0.000000E+00 | -4.027539E-04 | 2.064204E-04 |
| L1A2 | 0.000000E+00 | 0.000000E+00 | 1.750782E-03 | 1.190283E-04 |
| L2A1 | 0.000000E+00 | 0.000000E+00 | -5.162754E-03 | 3.155562E-04 |
| L2A2 | 0.000000E+00 | 0.000000E+00 | -2.859666E-02 | 2.136116E-03 |
| L3A1 | 0.000000E+00 | 0.000000E+00 | -1.911630E-02 | 8.072348E-03 |
| L3A2 | 0.000000E+00 | 0.000000E+00 | -5.316536E-03 | 1.369884E-02 |
| L4A1 | 0.000000E+00 | 0.000000E+00 | -2.132101E-02 | -7.626134E-03 |
| L4A2 | 0.000000E+00 | 0.000000E+00 | -2.448794E-02 | -1.201988E-02 |
| L5A1 | 0.000000E+00 | 0.000000E+00 | -3.278448E-02 | -1.060446E-03 |
| L5A2 | 0.000000E+00 | 0.000000E+00 | -1.827013E-02 | 3.166951E-03 |
| L6A1 | 0.000000E+00 | 0.000000E+00 | 4.704001E-05 | -1.772344E-04 |
| L6A2 | 0.000000E+00 | 0.000000E+00 | 1.211176E-03 | -3.737225E-04 |
| Surface # | $a_8$ | $a_{10}$ | $a_{12}$ | |
| L1A1 | -3.422556E-05 | 1.991843E-06 | 9.288751E-07 | |
| L1A2 | 4.691417E-05 | 2.410020E-06 | 2.330790E-06 | |
| L2A1 | 1.054054E-03 | -4.460390E-05 | -5.719675E-05 | |
| L2A2 | 2.789664E-03 | 1.968871E-03 | -1.095273E-03 | |
| L3A1 | 1.950425E-03 | 1.044361E-03 | -5.492092E-04 | |
| L3A2 | -2.347432E-03 | -3.672098E-03 | 1.680417E-03 | |
| L4A1 | 1.135054E-03 | -5.118523E-03 | 1.399797E-03 | |
| L4A2 | 8.959729E-03 | -2.740774E-03 | 6.527689E-05 | |
| L5A1 | 8.064062E-03 | -2.449097E-03 | -3.666522E-05 | |
| L5A2 | -7.061534E-05 | 1.100829E-03 | -3.060151E-04 | |
| L6A1 | 1.080940E-03 | -2.925392E-04 | 5.514368E-05 | |
| L6A2 | -2.510502E-04 | 3.655079E-04 | -4.966863E-05 | |

FIG. 41

| Embodiment 10 ||||||||
|---|---|---|---|---|---|---|---|
| EFL = 14.483 mm ; HFOV = 9.759 dgrees ; TTL = 13.333 mm ||||||||
| Fno = 3.541 ; Image Height = 2.502 mm ||||||||
| Surface # | | Radius (mm) | Thickness /air gap (mm) | Refractive index | Abbe number | Effective radius (mm) | Focal length (mm) | Material |
| OBJ | Object | INFINITY | INFINITY | | | | | |
| L1A1 | 1st lens element | 3.353 | 1.604 | 1.545 | 55.987 | 2.073 | 7.880 | Plastic |
| L1A2 | | 12.594 | 1.286 | | | 1.754 | | |
| STO | Aperture stop | INFINITY | 0.098 | | | 1.366 | | |
| L2A1 | 2nd lens element | 31.331 | 0.488 | 1.642 | 22.409 | 1.356 | -3.547 | Plastic |
| L2A2 | | 2.126 | 0.049 | | | 1.297 | | |
| L3A1 | 3rd lens element | 2.296 | 1.259 | 1.545 | 55.987 | 1.328 | 4.371 | Plastic |
| L3A2 | | 48.189 | 0.372 | | | 1.244 | | |
| L4A1 | 4th lens element | -4.860 | 0.255 | 1.545 | 55.987 | 1.239 | -3.273 | Plastic |
| L4A2 | | 2.881 | 0.044 | | | 1.399 | | |
| L5A1 | 5th lens element | 3.173 | 0.577 | 1.642 | 22.409 | 1.421 | 4.828 | Plastic |
| L5A2 | | -190.289 | 0.100 | | | 1.471 | | |
| L6A1 | 6th lens element | 10.385 | 0.422 | 1.545 | 55.987 | 1.533 | 100.043 | Plastic |
| L6A2 | | 12.637 | 0.042 | | | 1.561 | | |
| L7A1 | 7st lens element | 9.619 | 0.373 | 1.545 | 55.987 | 1.567 | 27.803 | Plastic |
| L7A2 | | 25.877 | 5.420 | | | 1.590 | | |
| TFA1 | Filtering unit | INFINITY | 0.210 | 1.517 | 64.167 | 2.358 | | |
| TFA2 | | INFINITY | 0.735 | | | 2.378 | | |
| IMA | Image plane | INFINITY | | | | 2.503 | | |

FIG. 44

| Embodiment 10 ||||
| Aspherical Parameters ||||
| Surface # | K | $a_2$ | $a_4$ | $a_6$ |
|---|---|---|---|---|
| L1A1 | 0.000000E+00 | 0.000000E+00 | -3.318752E-04 | 1.265429E-04 |
| L1A2 | 0.000000E+00 | 0.000000E+00 | 1.733389E-03 | 1.998978E-04 |
| L2A1 | 0.000000E+00 | 0.000000E+00 | -4.491139E-03 | 1.628595E-04 |
| L2A2 | 0.000000E+00 | 0.000000E+00 | -3.123200E-02 | 1.401110E-03 |
| L3A1 | 0.000000E+00 | 0.000000E+00 | -2.029272E-02 | 7.778544E-03 |
| L3A2 | 0.000000E+00 | 0.000000E+00 | -4.003833E-03 | 1.857368E-02 |
| L4A1 | 0.000000E+00 | 0.000000E+00 | -2.133559E-02 | -8.329762E-03 |
| L4A2 | 0.000000E+00 | 0.000000E+00 | -2.372676E-02 | -1.580688E-02 |
| L5A1 | 0.000000E+00 | 0.000000E+00 | -3.339833E-02 | -1.405846E-03 |
| L5A2 | 0.000000E+00 | 0.000000E+00 | -1.764386E-02 | 3.369305E-03 |
| L6A1 | 0.000000E+00 | 0.000000E+00 | -2.215192E-04 | -2.162991E-04 |
| L6A2 | 0.000000E+00 | 0.000000E+00 | -2.238121E-03 | -1.505645E-04 |
| L7A1 | 0.000000E+00 | 0.000000E+00 | -7.881131E-05 | 1.293399E-03 |
| L7A2 | 0.000000E+00 | 0.000000E+00 | 6.251947E-04 | 3.997005E-05 |
| Surface # | $a_8$ | $a_{10}$ | $a_{12}$ | |
| L1A1 | -2.266668E-05 | -5.084825E-07 | 1.142181E-06 | |
| L1A2 | -3.588676E-05 | 1.614204E-05 | 2.632890E-06 | |
| L2A1 | 1.001965E-03 | 1.101951E-04 | -8.194057E-05 | |
| L2A2 | 2.323095E-03 | 2.820002E-03 | -1.386576E-03 | |
| L3A1 | 3.040014E-03 | 5.350562E-04 | -5.567948E-04 | |
| L3A2 | -4.864091E-03 | -2.266692E-03 | 1.059931E-03 | |
| L4A1 | 6.520814E-04 | -5.072736E-03 | 1.558649E-03 | |
| L4A2 | 9.005873E-03 | -2.215007E-03 | 6.944868E-05 | |
| L5A1 | 8.212775E-03 | -2.745150E-03 | -7.471515E-06 | |
| L5A2 | -5.129823E-05 | 1.437253E-03 | -5.538057E-04 | |
| L6A1 | 1.429258E-03 | -3.522297E-04 | 5.633366E-07 | |
| L6A2 | -2.970959E-04 | -1.096341E-04 | -5.155906E-05 | |
| L7A1 | -1.685791E-03 | 3.059077E-04 | -1.078470E-04 | |
| L7A2 | 4.513642E-05 | 2.948482E-05 | -2.084698E-05 | |

FIG. 45

| Embodiment 11 ||||||||
| EFL = 14.477 mm；HFOV = 9.759 dgrees；TTL = 13.414 mm ||||||||
| Fno = 3.812；Image Height = 2.502 mm ||||||||
| Surface # | | Radius (mm) | Thickness /air gap (mm) | Refractive index | Abbe number | Effective radius (mm) | Focal length (mm) | Material |
|---|---|---|---|---|---|---|---|---|
| OBJ | Object | INFINITY | INFINITY | | | | | |
| L1A1 | 1st lens element | 3.511 | 1.469 | 1.545 | 55.987 | 1.906 | 8.224 | Plastic |
| L1A2 | | 13.688 | 1.093 | | | 1.647 | | |
| STO | Aperture stop | INFINITY | 0.111 | | | 1.366 | | |
| L2A1 | 2nd lens element | 10.542 | 0.591 | 1.642 | 22.409 | 1.356 | -3.841 | Plastic |
| L2A2 | | 1.967 | 0.040 | | | 1.271 | | |
| L3A1 | 3rd lens element | 2.263 | 1.173 | 1.545 | 55.987 | 1.292 | 4.322 | Plastic |
| L3A2 | | 44.664 | 0.319 | | | 1.210 | | |
| L4A1 | 4th lens element | -5.264 | 0.250 | 1.545 | 55.987 | 1.203 | -3.286 | Plastic |
| L4A2 | | 2.770 | 0.045 | | | 1.337 | | |
| L5A1 | 5th lens element | 3.137 | 0.567 | 1.642 | 22.409 | 1.351 | 4.943 | Plastic |
| L5A2 | | 148.815 | 0.061 | | | 1.386 | | |
| L6A1 | 6th lens element | 8.803 | 0.449 | 1.545 | 55.987 | 1.409 | 166.668 | Plastic |
| L6A2 | | 9.569 | 0.040 | | | 1.451 | | |
| L7A1 | 7st lens element | 8.029 | 0.408 | 1.545 | 55.987 | 1.471 | -160.931 | Plastic |
| L7A2 | | 7.225 | 0.044 | | | 1.508 | | |
| L8A1 | 8st lens element | 8.896 | 0.387 | 1.545 | 55.987 | 1.516 | 26.452 | Plastic |
| L8A2 | | 22.790 | 5.420 | | | 1.530 | | |
| TFA1 | Filtering unit | INFINITY | 0.210 | 1.517 | 64.167 | 2.360 | | |
| TFA2 | | INFINITY | 0.736 | | | 2.381 | | |
| IMA | Image plane | INFINITY | | | | 2.504 | | |

FIG. 48

| Embodiment 11 | | | | |
|---|---|---|---|---|
| Aspherical Parameters | | | | |
| Surface # | K | $a_2$ | $a_4$ | $a_6$ |
| L1A1 | 0.000000E+00 | 0.000000E+00 | -6.212738E-04 | 1.449270E-04 |
| L1A2 | 0.000000E+00 | 0.000000E+00 | 1.471161E-03 | 2.758122E-04 |
| L2A1 | 0.000000E+00 | 0.000000E+00 | -3.052554E-03 | 1.608117E-04 |
| L2A2 | 0.000000E+00 | 0.000000E+00 | -3.196467E-02 | 3.028090E-03 |
| L3A1 | 0.000000E+00 | 0.000000E+00 | -1.833024E-02 | 8.741042E-03 |
| L3A2 | 0.000000E+00 | 0.000000E+00 | -5.949231E-03 | 1.980079E-02 |
| L4A1 | 0.000000E+00 | 0.000000E+00 | -1.541229E-02 | -1.056558E-02 |
| L4A2 | 0.000000E+00 | 0.000000E+00 | -2.282162E-02 | -1.544620E-02 |
| L5A1 | 0.000000E+00 | 0.000000E+00 | -3.620663E-02 | 5.573868E-04 |
| L5A2 | 0.000000E+00 | 0.000000E+00 | -1.534176E-02 | 2.592316E-04 |
| L6A1 | 0.000000E+00 | 0.000000E+00 | 4.156065E-04 | -1.384055E-03 |
| L6A2 | 0.000000E+00 | 0.000000E+00 | -8.322993E-04 | -1.679186E-04 |
| L7A1 | 0.000000E+00 | 0.000000E+00 | 6.146271E-04 | -1.039937E-04 |
| L7A2 | 0.000000E+00 | 0.000000E+00 | 3.104243E-04 | -8.473162E-04 |
| L8A1 | 0.000000E+00 | 0.000000E+00 | 2.064186E-03 | -1.867591E-03 |
| L8A2 | 0.000000E+00 | 0.000000E+00 | 1.721016E-06 | -6.599211E-04 |
| Surface # | $a_8$ | $a_{10}$ | $a_{12}$ | |
| L1A1 | -5.384669E-05 | 7.594038E-06 | 5.517960E-07 | |
| L1A2 | -1.156133E-05 | 1.704983E-06 | 6.164025E-06 | |
| L2A1 | 1.221741E-03 | -1.720243E-04 | 5.071206E-06 | |
| L2A2 | 2.525418E-03 | 3.561331E-03 | -1.717860E-03 | |
| L3A1 | 5.697887E-03 | 6.570332E-04 | -7.795445E-04 | |
| L3A2 | -4.984224E-03 | -2.742707E-03 | 5.575713E-04 | |
| L4A1 | -1.348386E-03 | -4.705033E-03 | 7.300706E-05 | |
| L4A2 | 8.578024E-03 | -3.100160E-03 | -4.114248E-04 | |
| L5A1 | 8.033912E-03 | -3.576705E-03 | -2.674650E-06 | |
| L5A2 | -1.423086E-03 | 1.036799E-03 | -8.020250E-05 | |
| L6A1 | 8.319776E-04 | -9.145754E-04 | 2.721767E-05 | |
| L6A2 | -5.867208E-06 | 3.768990E-04 | 9.242880E-05 | |
| L7A1 | -2.273159E-03 | 1.074370E-03 | 5.407038E-05 | |
| L7A2 | -3.469279E-04 | -2.408982E-04 | -8.140480E-06 | |
| L8A1 | 3.517368E-04 | -7.374706E-05 | 2.724881E-05 | |
| L8A2 | 7.666723E-05 | 7.039163E-05 | 5.533826E-05 | |

FIG. 49

| Embodiment | 1st | 2nd | 3rd | 4th |
|---|---|---|---|---|
| T1 | 1.268 | 1.696 | 1.093 | 1.148 |
| G12 | 0.980 | 2.051 | 1.713 | 1.773 |
| T2 | 0.280 | 0.250 | 0.972 | 0.701 |
| G23 | 0.119 | 0.068 | 0.040 | 0.040 |
| T3 | 1.178 | 0.922 | 1.247 | 1.148 |
| G34 | 0.160 | 0.769 | 0.501 | 0.551 |
| T4 | 0.342 | 0.250 | 0.290 | 0.315 |
| G45 | 0.040 | 0.134 | 0.040 | 0.040 |
| T5 | 0.527 | 0.614 | 0.768 | 0.854 |
| G5F | 5.420 | 5.420 | 5.420 | 5.420 |
| TTF | 0.210 | 0.210 | 0.210 | 0.210 |
| GFP | 0.686 | 0.724 | 0.669 | 0.669 |
| BFL | 6.316 | 6.384 | 6.299 | 6.299 |
| ALT | 3.595 | 3.731 | 4.369 | 4.166 |
| AAG | 1.298 | 3.021 | 2.294 | 2.403 |
| TL | 4.893 | 6.753 | 6.663 | 6.570 |
| (T2+G23+T3+G34+T4+G45+T5)/G12 | 2.700 | 1.466 | 2.251 | 2.059 |
| (T2+G23+T3+G34+T4+G45+T5)/(T1+G12) | 1.177 | 0.802 | 1.374 | 1.250 |
| HFOV/Fno | 3.767 | 2.184 | 2.079 | 2.105 |
| HFOV/BFL | 1.878 | 1.529 | 1.549 | 1.549 |
| HFOV/ALT | 3.300 | 2.615 | 2.234 | 2.342 |
| HFOV/TL | 2.424 | 1.445 | 1.465 | 1.485 |
| TTL/EFL | 0.950 | 0.902 | 0.893 | 0.882 |
| AAG/T1 | 1.024 | 1.782 | 2.100 | 2.094 |
| AAG/T3 | 1.102 | 3.276 | 1.840 | 2.093 |
| (T2+T4+G12+G34)/T1 | 1.390 | 1.958 | 3.181 | 2.910 |
| (T5+G12+G23+G34)/(T1+T2) | 1.154 | 1.799 | 1.464 | 1.740 |
| (T5+G12+G34+G45)/(T1+T4) | 1.060 | 1.833 | 2.186 | 2.199 |
| (T2+T4+G12+G34)/T3 | 1.495 | 3.600 | 2.788 | 2.908 |
| (T2+T4+G23+G34)/T3 | 0.764 | 1.449 | 1.445 | 1.400 |
| (T2+T4+G34+G45)/T3 | 0.697 | 1.521 | 1.445 | 1.400 |
| (G12+G23+T5)/(T2+G34) | 3.700 | 2.682 | 1.713 | 2.130 |
| (G12+G45+T5)/(T4+G34) | 3.082 | 2.747 | 3.190 | 3.079 |

FIG. 50A

| Embodiment | 5th | 6th | 7th | 8th |
|---|---|---|---|---|
| T1 | 1.554 | 1.738 | 1.001 | 1.629 |
| G12 | 1.421 | 1.369 | 1.909 | 1.485 |
| T2 | 0.876 | 0.658 | 0.540 | 0.380 |
| G23 | 0.040 | 0.040 | 0.040 | 0.040 |
| T3 | 1.277 | 0.962 | 3.303 | 1.305 |
| G34 | 0.355 | 0.334 | 0.114 | 0.439 |
| T4 | 0.574 | 0.362 | 0.642 | 0.482 |
| G45 | 0.040 | 0.317 | 0.040 | 0.040 |
| T5 | 0.676 | 0.541 | 0.472 | 0.600 |
| G5F | 5.420 | 5.420 | 5.420 | 5.420 |
| TTF | 0.210 | 0.210 | 0.210 | 0.210 |
| GFP | 0.669 | 1.169 | 0.831 | 0.672 |
| BFL | 6.299 | 6.799 | 6.461 | 6.302 |
| ALT | 4.955 | 4.260 | 5.958 | 4.395 |
| AAG | 1.855 | 2.060 | 2.103 | 2.004 |
| TL | 6.811 | 6.321 | 8.061 | 6.399 |
| (T2+G23+T3+G34+T4+G45+T5)/G12 | 2.700 | 2.348 | 2.699 | 2.212 |
| (T2+G23+T3+G34+T4+G45+T5)/(T1+G12) | 1.290 | 1.035 | 1.770 | 1.055 |
| HFOV/Fno | 2.676 | 2.769 | 2.665 | 2.917 |
| HFOV/BFL | 1.549 | 1.435 | 1.444 | 1.549 |
| HFOV/ALT | 1.969 | 2.291 | 1.566 | 2.220 |
| HFOV/TL | 1.433 | 1.544 | 1.157 | 1.525 |
| TTL/EFL | 0.901 | 0.903 | 0.950 | 0.878 |
| AAG/T1 | 1.194 | 1.185 | 2.100 | 1.230 |
| AAG/T3 | 1.453 | 2.142 | 0.637 | 1.535 |
| (T2+T4+G12+G34)/T1 | 2.076 | 1.566 | 3.200 | 1.710 |
| (T5+G12+G23+G34)/(T1+T2) | 1.025 | 0.953 | 1.645 | 1.277 |
| (T5+G12+G34+G45)/(T1+T4) | 1.171 | 1.220 | 1.542 | 1.215 |
| (T2+T4+G12+G34)/T3 | 2.526 | 2.830 | 0.970 | 2.134 |
| (T2+T4+G23+G34)/T3 | 1.444 | 1.449 | 0.405 | 1.027 |
| (T2+T4+G34+G45)/T3 | 1.444 | 1.738 | 0.405 | 1.027 |
| (G12+G23+T5)/(T2+G34) | 1.736 | 1.964 | 3.700 | 2.597 |
| (G12+G45+T5)/(T4+G34) | 2.301 | 3.200 | 3.200 | 2.309 |

FIG. 50B

| Embodiment | 9th | 10th | 11th |
|---|---|---|---|
| T1 | 1.625 | 1.604 | 1.469 |
| G12 | 1.400 | 1.384 | 1.204 |
| T2 | 0.479 | 0.488 | 0.591 |
| G23 | 0.040 | 0.049 | 0.040 |
| T3 | 1.309 | 1.259 | 1.173 |
| G34 | 0.382 | 0.372 | 0.319 |
| T4 | 0.293 | 0.255 | 0.250 |
| G45 | 0.040 | 0.044 | 0.045 |
| T5 | 0.674 | 0.577 | 0.567 |
| G5F | 5.969 | 6.356 | 6.810 |
| G56 | 0.105 | 0.100 | 0.061 |
| T6 | 0.444 | 0.422 | 0.449 |
| G6F | 5.420 | 5.834 | 6.300 |
| G67 |  | 0.042 | 0.040 |
| T7 |  | 0.373 | 0.408 |
| G7F |  | 5.420 | 5.852 |
| G78 |  |  | 0.044 |
| T8 |  |  | 0.387 |
| G8F |  |  | 5.420 |
| TTF | 0.210 | 0.210 | 0.210 |
| GFP | 0.732 | 0.735 | 0.736 |
| BFL | 6.910 | 7.301 | 7.755 |
| ALT | 4.380 | 4.183 | 4.050 |
| AAG | 1.862 | 1.848 | 1.609 |
| TL | 6.242 | 6.032 | 5.659 |
| (T2+G23+T3+G34+T4+G45+T5)/G12 | 2.298 | 2.199 | 2.479 |
| (T2+G23+T3+G34+T4+G45+T5)/(T1+G12) | 1.063 | 1.018 | 1.117 |
| HFOV/Fno | 2.795 | 2.756 | 2.560 |
| HFOV/BFL | 1.412 | 1.337 | 1.258 |
| HFOV/ALT | 2.228 | 2.333 | 2.409 |
| HFOV/TL | 1.563 | 1.618 | 1.725 |
| TTL/EFL | 0.913 | 0.921 | 0.927 |
| AAG/T1 | 1.146 | 1.152 | 1.095 |
| AAG/T3 | 1.423 | 1.468 | 1.371 |
| (T2+T4+G12+G34)/T1 | 1.572 | 1.557 | 1.610 |
| (T5+G12+G23+G34)/(T1+T2) | 1.186 | 1.138 | 1.034 |
| (T5+G12+G34+G45)/(T1+T4) | 1.301 | 1.278 | 1.242 |
| (T2+T4+G12+G34)/T3 | 1.952 | 1.985 | 2.015 |
| (T2+T4+G23+G34)/T3 | 0.913 | 0.924 | 1.023 |
| (T2+T4+G34+G45)/T3 | 0.913 | 0.921 | 1.028 |
| (G12+G23+T5)/(T2+G34) | 2.454 | 2.338 | 1.988 |
| (G12+G45+T5)/(T4+G34) | 3.130 | 3.200 | 3.191 |

FIG. 50C

OPTICAL IMAGING LENS

CROSS-REFERENCE TO RELATED APPLICATIONS

This application claims priority to P.R.C. Patent Application No. 201910176693.2 titled "Optical Imaging Lens," filed on Mar. 8, 2019, with the State Intellectual Property Office of the People's Republic of China (SIPO).

TECHNICAL FIELD

The present disclosure relates to an optical imaging lens, and particularly, to an optical imaging lens for a telephoto lens.

BACKGROUND

Technology for portable electronic products improves every day. The key components of the portable electronic products, optical imaging lens, are developed in diversity. Applications are not limited to shooting images and video, but also the demand for telephoto. The optical imaging lens with the wide-angle lens has an ability to achieve the function of optical zoom. The longer of the system focal length of the telephoto lens, the higher of the optical zoom ratio.

The system length is increased while the focal length of the optical imaging lens is increased, such that the distances between the lens elements are increased to reduce the assembly and manufacturing yield. Accordingly, how to increase the focal length of the optical imaging lens while maintaining imaging quality and improving assembly and manufacturing yield is a subject that needs to be discussed in depth.

SUMMARY

In light of the abovementioned problems, the optical imaging lens having good imaging quality, a smaller size, increased system focal length and increased manufacturing is the point of improvement.

The present disclosure provides an optical imaging lens for capturing images and videos such as the optical imaging lens of cell phones, cameras, tablets and personal digital assistants. By controlling the convex or concave shape of the surfaces of lens elements, the size of the optical imaging lens may be reduced, the system focal length of the optical imaging lens may be increased, and the manufacturing may be raised while maintaining good optical characteristics.

In the specification, parameters used herein may include:

| Parameter | Definition |
|---|---|
| T1 | A thickness of the first lens element along the optical axis |
| G12 | A distance from the image-side surface of the first lens element to the object-side surface of the second lens element along the optical axis |
| T2 | A thickness of the second lens element along the optical axis |
| G23 | A distance from the image-side surface of the second lens element to the object-side surface of the third lens element along the optical axis |
| T3 | A thickness of the third lens element along the optical axis |
| G34 | A distance from the image-side surface of the third lens element to the object-side surface of the fourth lens element along the optical axis |
| T4 | A thickness of the fourth lens element along the optical axis |
| G45 | A distance from the image-side surface of the fourth lens element to the object-side surface of the fifth lens element along the optical axis |
| T5 | A thickness of the fifth lens element along the optical axis |
| G5F | A distance from the image-side surface of the fifth lens element to the object-side surface of the filtering unit along the optical axis |
| G56 | A distance from the image-side surface of the fifth lens element to the object-side surface of the sixth lens element along the optical axis |
| T6 | A thickness of the sixth lens element along the optical axis |
| G6F | A distance from the image-side surface of the sixth lens element to the object-side surface of the filtering unit along the optical axis |
| G67 | A distance from the image-side surface of the sixth lens element to the object-side surface of the seventh lens element along the optical axis |
| T7 | A thickness of the seventh lens element along the optical axis |
| G7F | A distance from the image-side surface of the seventh lens element to the object-side surface of the filtering unit along the optical axis |
| G78 | A distance from the image-side surface of the seventh lens element to the object-side surface of the eighth lens element along the optical axis |
| T8 | A thickness of the eighth lens element along the optical axis |
| G8F | A distance from the image-side surface of the eighth lens element to the object-side surface of the filtering unit along the optical axis |
| TTF | A thickness of the filtering unit along the optical axis |
| GFP | A distance from the image-side surface of the filtering unit to the image plane along the optical axis |
| f1 | A focal length of the first lens element |
| f2 | A focal length of the second lens element |
| f3 | A focal length of the third lens element |
| f4 | A focal length of the fourth lens element |
| f5 | A focal length of the fifth lens element |
| f6 | A focal length of the sixth lens element |
| f7 | A focal length of the seventh lens element |
| f8 | A focal length of the eighth lens element |
| n1 | A refractive index of the first lens element |
| n2 | A refractive index of the second lens element |
| n3 | A refractive index of the third lens element |
| n4 | A refractive index of the fourth lens element |
| n5 | A refractive index of the fifth lens element |
| n6 | A refractive index of the sixth lens element |
| n7 | A refractive index of the seventh lens element |
| n8 | A refractive index of the eighth lens element |
| V1 | An Abbe number of the first lens element |
| V2 | An Abbe number of the second lens element |
| V3 | An Abbe number of the third lens element |
| V4 | An Abbe number of the fourth lens element |
| V5 | An Abbe number of the fifth lens element |
| V6 | An Abbe number of the sixth lens element |
| V7 | An Abbe number of the seventh lens element |
| V8 | An Abbe number of the eighth lens element |
| HFOV | Half Field of View of the optical imaging lens |
| Fno | F-number of the optical imaging lens |
| EFL | An effective focal length of the optical imaging lens |
| TTL | A distance from the object-side surface of the first lens element to the image plane along the optical axis, i.e., the length of the optical imaging lens |
| ALT | A sum of the thicknesses of the first lens element, the second lens element, the third lens element, the fourth lens element, and the fifth along the optical axis, i.e., a sum of T1, T2, T3, T4 and T5 |
| AAG | A sum of the a distance from the image-side surface of the first lens element to the object-side surface of the second lens element along the optical axis, a distance from the image-side surface of the second lens element to the object-side surface of the third lens element along the optical axis, a distance from the image-side surface of the third lens element to the object-side surface of the fourth lens element along the optical axis, and a distance from the image-side surface of the fourth lens element to the object-side surface of the fifth lens element along the optical axis, i.e., a sum of G12, G23, G34, G45 |

-continued

| Parameter | Definition |
|---|---|
| BFL | A distance from the image-side surface of the fifth lens element to the image plane along the optical axis (A sum of G5F, TTF and GFP) |
| TL | A distance from the object-side surface of the first lens element to the image-side surface of the fifth lens element along the optical axis |
| ImgH | An image height of the optical imaging lens |

According to an embodiment of the optical imaging lens of the present disclosure, an optical imaging lens may comprise a first lens element, a second lens element, a third lens element, a fourth lens element, and a fifth lens element sequentially from an object side to an image side along an optical axis. The first lens element to the fifth lens element may each comprise an object-side surface facing toward the object side and allowing imaging rays to pass through and an image-side surface facing toward the image side and allowing the imaging rays to pass through. The first lens element may be arranged to be a lens element having refracting power in a first order from the object side to the image side and may have positive refracting power. The second lens element may be arranged to be a lens element having refracting power in a second order from the object side to the image side. A periphery region of the image-side surface of the second lens element may be concave. The third lens element may be arranged to be a lens element having refracting power in a third order from the object side to the image side. The fourth lens element may be arranged to be a lens element having refracting power in a fourth order from the object side to the image side. The fifth lens element may be arranged to be a lens element having refracting power in a fifth order from the object side to the image side and may have positive refracting power. A periphery region of the image-side surface of the fifth lens element may be convex. The optical imaging lens may be a fixed-focus lens. The optical imaging lens may satisfy Inequality:

$(T2+G23+T3+G34+T4+G45+T5)/G12 \leq 2.700$        Inequality (1).

According to another embodiment of the optical imaging lens of the present disclosure, an optical imaging lens may comprise a first lens element, a second lens element, a third lens element, a fourth lens element, and a fifth lens element sequentially from an object side to an image side along an optical axis. The first lens element to the fifth lens element may each comprise an object-side surface facing toward the object side and allowing imaging rays to pass through and an image-side surface facing toward the image side and allowing the imaging rays to pass through. The first lens element may be arranged to be a lens element having refracting power in a first order from the object side to the image side and may have positive refracting power. The second lens element may be arranged to be a lens element having refracting power in a second order from the object side to the image side. The third lens element may arranged to be a lens element having refracting power in a third order from the object side to the image side. The fourth lens element may be arranged to be a lens element having refracting power in a fourth order from the object side to the image side. The fifth lens element may be arranged to be a lens element having refracting power in a fifth order from the object side to the image side and may have positive refracting power. A periphery region of the image-side surface of the fifth lens element may be convex. The optical imaging lens may be a fixed-focus lens. The optical imaging lens may satisfy Inequalities:

$(T2+G23+T3+G34+T4+G45+T5)/G12 \leq 2.700$        Inequality (1); and $HFOV/Fno \leq 4.200°$        Inequality (2).

According to another embodiment of the optical imaging lens of the present disclosure, an optical imaging lens may comprise a first lens element, a second lens element, a third lens element, a fourth lens element, and a fifth lens element sequentially from an object side to an image side along an optical axis. The first lens element to the fifth lens element may each comprise an object-side surface facing toward the object side and allowing imaging rays to pass through and an image-side surface facing toward the image side and allowing the imaging rays to pass through. The first lens element may be arranged to be a lens element having refracting power in a first order from the object side to the image side and may have positive refracting power. The second lens element may be arranged to be a lens element having refracting power in a second order from the object side to the image side. The third lens element may be arranged to be a lens element having refracting power in a third order from the object side to the image side. The fourth lens element may be arranged to be a lens element having refracting power in a fourth order from the object side to the image side. The fifth lens element may be arranged to be a lens element having refracting power in a fifth order from the object side to the image side and may have positive refracting power. A periphery region of the image-side surface of the fifth lens element may be convex. The optical imaging lens may be a fixed-focus lens. The optical imaging lens may satisfy Inequalities:

$HFOV/Fno \leq 4.200°$        Inequality (2); and $(T2+G23+T3+G34+T4+G45+T5)/(T1+G12) \leq 2.200$        Inequality (3).

In abovementioned three exemplary embodiments, some Inequalities could be selectively taken into consideration as follows:

$V1 > V2+V5$        Inequality (4);

$V3 > V2+V5$        Inequality (5);

$V4 > V2+V5$        Inequality (6);

$HFOV/BFL \leq 4.400°/mm$        Inequality (7);

$HFOV/ALT \leq 3.300°/mm$        Inequality (8);

$HFOV/TL \leq 2.500°/mm$        Inequality (9);

$TTL/EFL \leq 0.950$        Inequality (10);

$AAG/T1 \leq 2.100$        Inequality (11);

$AAG/T3 \leq 3.500$        Inequality (12);

$(T2+T4+G12+G34)/T1 \leq 3.200$        Inequality (13);

$(T5+G12+G23+G34)/(T1+T2) \leq 1.800$        Inequality (14);

$(T5+G12+G34+G45)/(T1+T4) \leq 2.200$        Inequality (15);

$(T2+T4+G12+G34)/T3 \leq 3.600$        Inequality (16);

$(T2+T4+G23+G34)/T3 \leq 1.480$        Inequality (17);

$(T2+T4+G34+G45)/T3 \leq 2.200$        Inequality (18);

$(G12+G23+T5)/(T2+G34) \leq 3.700$  Inequality (19); and $(G12+G45+T5)/(T4+G34) \leq 3.200$  Inequality (20).

In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated into the example embodiments if no inconsistency occurs.

Through controlling the convex or concave shape of the surfaces and at least one inequality, the optical imaging lens in the example embodiments may maintain good imaging quality, the length and the focal length of the optical imaging lens may be effectively shortened, and the field of view of the optical imaging lens may be extended to achieve low cost, high assembly and high yield.

BRIEF DESCRIPTION OF THE DRAWINGS

Exemplary embodiments will be more readily understood from the following detailed description when read in conjunction with the appended drawings, in which:

FIG. 1 depicts a cross-sectional view of one single lens element according to one embodiment of the present disclosure;

FIG. 2 depicts a schematic view of a relation between a surface shape and an optical focus of a lens element;

FIG. 3 depicts a schematic view of a first example of a surface shape and an effective radius of a lens element;

FIG. 4 depicts a schematic view of a second example of a surface shape and an effective radius of a lens element;

FIG. 5 depicts a schematic view of a third example of a surface shape and an effective radius of a lens element;

FIG. 8 depicts a table of optical data for each lens element of an optical imaging lens according to the first embodiment of the present disclosure;

FIG. 9 depicts a table of aspherical data of the optical imaging lens according to the first embodiment of the present disclosure;

FIG. 12 depicts a table of optical data for each lens element of the optical imaging lens according to the second embodiment of the present disclosure;

FIG. 13 depicts a table of aspherical data of the optical imaging lens according to the second embodiment of the present disclosure;

FIG. 16 depicts a table of optical data for each lens element of the optical imaging lens according to the third embodiment of the present disclosure;

FIG. 17 depicts a table of aspherical data of the optical imaging lens according to the third embodiment of the present disclosure;

FIG. 20 depicts a table of optical data for each lens element of the optical imaging lens according to the fourth embodiment of the present disclosure;

FIG. 21 depicts a table of aspherical data of the optical imaging lens according to the fourth embodiment of the present disclosure;

FIG. 24 depicts a table of optical data for each lens element of the optical imaging lens according to the fifth embodiment of the present disclosure;

FIG. 25 depicts a table of aspherical data of the optical imaging lens according to the fifth embodiment of the present disclosure;

FIG. 28 depicts a table of optical data for each lens element of the optical imaging lens according to the sixth embodiment of the present disclosure;

FIG. 29 depicts a table of aspherical data of the optical imaging lens according to the sixth embodiment of the present disclosure;

FIG. 32 depicts a table of optical data for each lens element of the optical imaging lens according to the seventh embodiment of the present disclosure;

FIG. 33 depicts a table of aspherical data of the optical imaging lens according to the seventh embodiment of the present disclosure;

FIG. 36 depicts a table of optical data for each lens element of the optical imaging lens according to the eighth embodiment of the present disclosure;

FIG. 37 depicts a table of aspherical data of the optical imaging lens according to the eighth embodiment of the present disclosure;

FIG. 40 depicts a table of optical data for each lens element of the optical imaging lens according to the ninth embodiment of the present disclosure;

FIG. 41 depicts a table of aspherical data of the optical imaging lens according to the ninth embodiment of the present disclosure;

FIG. 44 depicts a table of optical data for each lens element of the optical imaging lens according to the tenth embodiment of the present disclosure;

FIG. 45 depicts a table of aspherical data of the optical imaging lens according to the tenth embodiment of the present disclosure;

FIG. 48 depicts a table of optical data for each lens element of the optical imaging lens according to the eleventh embodiment of the present disclosure;

FIG. 49 depicts a table of aspherical data of the optical imaging lens according to the eleventh embodiment of the present disclosure;

FIG. 50A is a table for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), (G12+G45+T5)/(T4+G34) as determined in the first to fourth embodiments;

FIG. 50B is a table for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4)(T2+T4+G12+G34)/T3, (T2+T4+G23+G34)/T3, (T2+T4+G34+G45)/T3, (G12+G23+T5)/(T2+G34), (G12+G45+T5)/(T4+G34) as determined in the fifth to eighth embodiments; and FIG. 50C is a table for the values of T1, G12, T2, G23, T3, G34, T4, G45, T5, G5F, G56, T6, G6F, G67, T7, G7F, G78, T8, G8F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), (G12+G45+T5)/(T4+G34) as determined in the ninth to eleventh embodiments.

DETAILED DESCRIPTION

Figure 6:
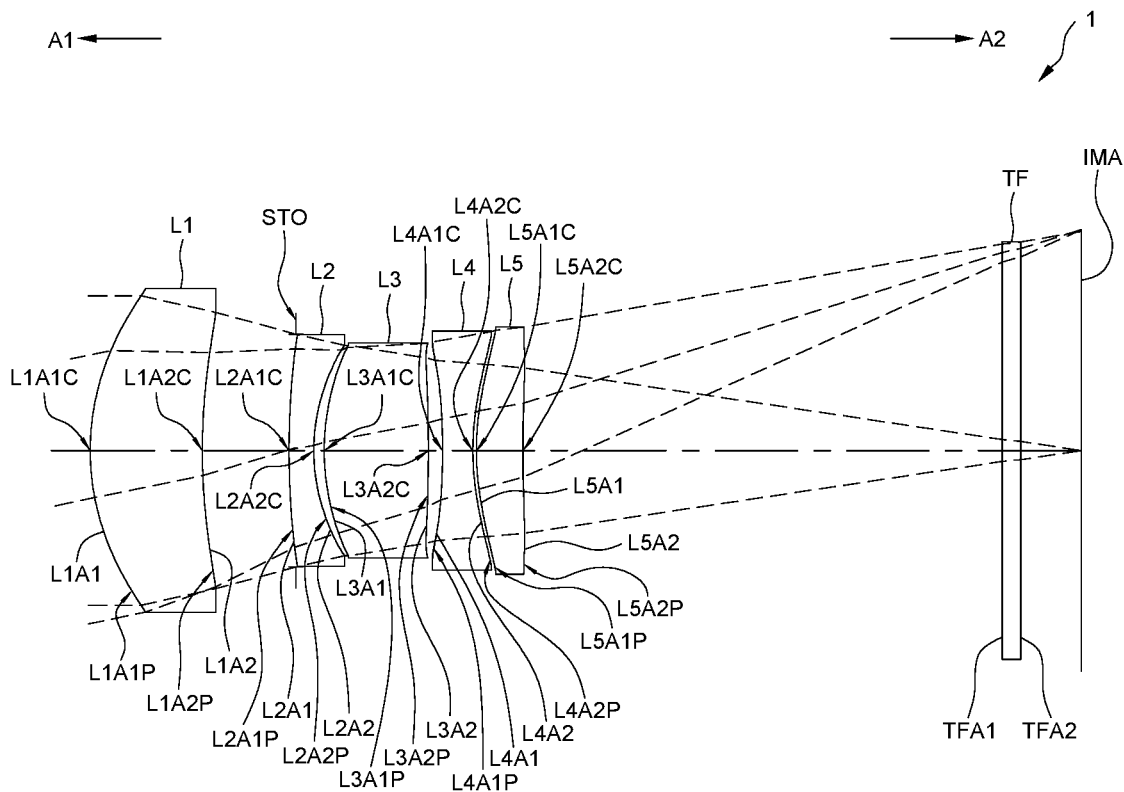
FIG. 6 depicts a cross-sectional view of the optical imaging lens according to the first embodiment of the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

The region of a surface of the lens element from the central point to the first transition point TP1 is defined as the optical axis region, which includes the central point. The region located radially outside of the farthest Nth transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

According to an embodiment of the optical imaging lens of the present disclosure, an optical imaging lens may comprise a first lens element, a second lens element, a third lens element, a fourth lens element and a fifth lens element sequentially from an object side to an image side along an optical axis. The first lens element to the fifth lens element may each comprise an object-side surface facing toward the object side and allowing imaging rays to pass through and an image-side surface facing toward the image side and allowing the imaging rays to pass through. By designing the following detail features of lens elements incorporated one another, the length and the focal length of the optical imaging lens may be effectively shortened, and the field of view of the optical imaging lens may be effectively extended while maintaining good optical characteristics.

In some embodiments of the optical imaging lens of the present disclosure, the first lens element is set to be a lens element having refracting power in a first order from the object side to the image side and have positive refracting power; the second lens element is set to be a lens element having refracting power in a second order from the object side to the image side; the third lens element is set to be a lens element having refracting power in a third order from the object side to the image side; the fourth lens element is set to be a lens element having refracting power in a fourth order from the object side to the image side; the fifth lens element is set to be a lens element having refracting power in a fifth order from the object side to the image side and have positive refracting power; a periphery region of the image-side surface of the fifth lens element is set to be convex; the optical imaging lens is set to be a fixed-focus lens; and the optical imaging lens is set to satisfy the following three combinations, such that the focal length of the optical imaging lens is increased while the distance between the second lens element and the fifth lens element is shortened to improve the assembly. In addition, the optical imaging lens being a fixed-focus lens may be beneficial for maintaining the effective radius of the second lens element to the fifth lens element to be less than or equal to 2 mm, so as to meet the size of the lens for the portable electronic device:

First combination: a periphery region of the image-side surface of the second lens element is set to be concave and the optical imaging lens is set to satisfy Inequality (1): $(T2+G23+T3+G34+T4+G45+T5)/G12 \leq 2.700$;

Second combination: the optical imaging lens is set to satisfy Inequality (1): $(T2+G23+T3+G34+T4+G45+T5)/G12 \leq 2.700$ and Inequality (2): $HFOV/Fno \leq 4.200°$; and Third combination: the optical imaging lens is set to satisfy Inequality (2): $HFOV/Fno \leq 4.200°$ and Inequality (3): $(T2+G23+T3+G34+T4+G45+T5)/(T1+G12) \leq 2.200$.

The further restrictions for Inequalities (1), (2) and (3) defined below may constitute better configuration: $1.200 \leq (T2+G23+T3+G34+T4+G45+T5)/G12 \leq 2.700$, $1.600° \leq HFOV/Fno \leq 4.200°$ and $0.640 \leq (T2+G23+T3+G34+T4+G45+T5)/(T1+G12) \leq 2.200$.

Moreover, the optical imaging lens satisfying Inequalities (4), (5) and (6), V1>V2+V5, V3>V2+V5 and V4>V2+V5, cooperated with the limitation of the surface shape of the lens elements may be beneficial for correcting chromatic aberration of the optical system, and reducing the distance between the second lens element and the fifth lens element may be beneficial for improving the assembly and yield.

In some embodiments of the optical imaging lens of the present disclosure, to maintain appropriate values of the thickness of each lens element and gaps between the lens elements for preventing optical imaging lens parameters that are too large to allow the length of the optical imaging lens to be sufficiently shortened, and preventing optical imaging lens parameters that are too small to interfere with assembly of the optical imaging lens and the difficulty of manufacture.

The further restriction for Inequality (7), $HFOV/BFL \leq 4.400°/mm$, defined below may constitute better configuration: $0.960°/mm \leq HFOV/BFL \leq 4.400°/mm$.

The further restriction for Inequality (8), $HFOV/ALT \leq 3.300°/mm$, defined below may constitute better configuration: $1.200°/mm \leq HFOV/ALT \leq 3.300°/mm$.

The further restriction for Inequality (9), $HFOV/TL \leq 2.500°/mm$, defined below may constitute better configuration: $0.880°/mm \leq HFOV/TL \leq 2.500°/mm$.

The further restriction for Inequality (10), $TTL/EFL \leq 0.950$, defined below may constitute better configuration: $0.700 \leq TTL/EFL \leq 0.950$.

The further restriction for Inequality (11), $AAG/T1 \leq 2.100$, defined below may constitute better configuration: $0.800 \leq AAG/T1 \leq 2.100$.

The further restriction for Inequality (12), $AAG/T3 \leq 3.500$, defined below may constitute better configuration: $0.480 \leq AAG/T3 \leq 3.500$.

The further restriction for Inequality (13), $(T2+T4+G12+G34)/T1 \leq 3.200$, defined below may constitute better configuration: $1.120 \leq (T2+T4+G12+G34)/T1 \leq 3.200$.

The further restriction for Inequality (14), $(T5+G12+G23+G34)/(T1+T2) \leq 1.800$, defined below may constitute better configuration: $0.760 \leq (T5+G12+G23+G34)/(T1+T2) \leq 1.800$.

The further restriction for Inequality (15), (T5+G12+G34+G45)/(T1+T4)≤2.200, defined below may constitute better configuration: 0.800≤(T5+G12+G34+G45)/(T1+T4)≤2.200.

The further restriction for Inequality (16), (T2+T4+G12+G34)/T3≤3.600, defined below may constitute better configuration: 0.770≤(T2+T4+G12+G34)/T3≤3.600.

The further restriction for Inequality (17), (T2+T4+G23+G34)/T3≤1.480, defined below may constitute better configuration: 0.400≤(T2+T4+G23+G34)/T3≤1.480.

The further restriction for Inequality (18), (T2+T4+G34+G45)/T3≤2.200, defined below may constitute better configuration: 0.400≤(T2+T4+G34+G45)/T3≤2.200.

The further restriction for Inequality (19), (G12+G23+T5)/(T2+G34)≤3.700, defined below may constitute better configuration: 1.360≤(G12+G23+T5)/(T2+G34)≤3.700.

The further restriction for Inequality (20), (G12+G45+T5)/(T4+G34)≤3.200, defined below may constitute better configuration: 1.680≤(G12+G45+T5)/(T4+G34)≤3.200.

In addition, any combination of the parameters of the embodiment may be selected to increase the optical imaging lens limitation to facilitate the optical imaging lens design of the same architecture of the present invention.

In consideration of the non-predictability of design for the optical system, while the optical imaging lens may satisfy any one of inequalities described above, the optical imaging lens according to the disclosure herein may achieve a shortened length and an increase aperture, improve an imaging quality or assembly yield, and effectively improve drawbacks of a typical optical imaging lens.

The range of values within the maximum and minimum values derived from the combined ratios of the optical parameters can be implemented according to the following embodiments.

Figure 7:
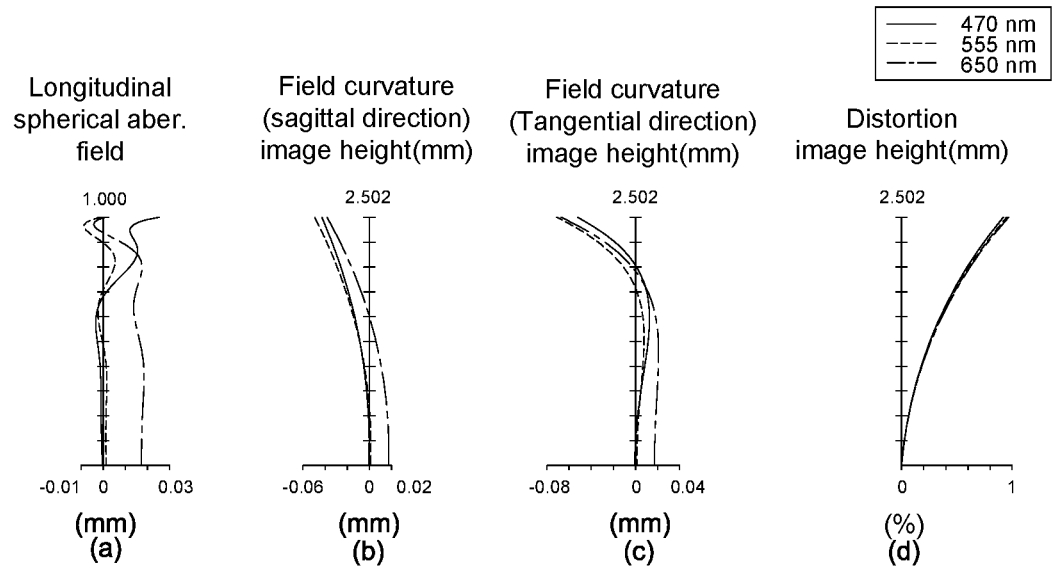
FIG. 7 depicts a chart of a longitudinal spherical aberration and other kinds of optical aberrations of the optical imaging lens according to the first embodiment of the present disclosure.

Reference is now made to FIGS. 6-9. FIG. 6 illustrates an example cross-sectional view of an optical imaging lens 1 according to a first example embodiment. FIG. 7 shows example charts of a longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5. A filtering unit TF and an image plane IMA of an image sensor (not shown) may be positioned at the image side A2 of the optical imaging lens 1. Each of the first, second, third, fourth and fifth lens elements L1, L2, L3, L4 and L5, and the filtering unit TF may comprise an object-side surface L1A1/L2A1/L3A1/L4A1/L5A1/TFA1 facing toward the object side A1 and an image-side surface L1A2/L2A2/L3A2/L4A2/L5A2//TFA2 facing toward the image side A2. The example embodiment of the illustrated filtering unit TF may be positioned between the fifth lens element L5 and the image plane IMA. The filtering unit TF may be a filter for preventing light with certain wavelength from reaching the mage plane IMA and affecting imaging quality.

Exemplary embodiments of each lens element of the optical imaging lens 1 will now be described with reference to the drawings. The lens elements L1, L2, L3, L4 and L5 of the optical imaging lens 1 may be constructed using plastic materials in this embodiment.

An example embodiment of the first lens element L1 may have positive refracting power. Both of the optical axis region L1A1C and the periphery region L1A1P of the object-side surface L1A1 of the first lens element L1 may be convex. Both of the optical axis region L1A2C and the periphery region L1A2P of the image-side surface L1A2 of the first lens element L1 may be concave.

An example embodiment of the second lens element L2 may have negative refracting power. Both of the optical axis region L2A1C and the periphery region L2A1P of the object-side surface L2A1 of the second lens element L2 may be convex. Both of the optical axis region L2A2C and the periphery region L2A2P of the image-side surface L2A2 of the second lens element L2 may be concave.

An example embodiment of the third lens element L3 may have positive refracting power. Both of the optical axis region L3A1C and the periphery region L3A1P of the object-side surface L3A1 of the third lens element L3 may be convex. The optical axis region L3A2C of the image-side surface L3A2 of the third lens element L3 may be convex. The periphery region L3A2P of the image-side surface L3A2 of the third lens element L3 may be concave.

An example embodiment of the fourth lens element L4 may have negative refracting power. Both of the optical axis region L4A1C and the periphery region L4A1P of the object-side surface L4A1 of the fourth lens element L4 may be concave. Both of the optical axis region L4A2C and the periphery region L4A2P of the image-side surface L4A2 of the fourth lens element L4 may be concave.

An example embodiment of the fifth lens element L5 may have positive refracting power. Both of the optical axis region L5A1C and the periphery region L5A1P of the object-side surface L5A1 of the fifth lens element L5 may be convex. The optical axis region L5A2C of the image-side surface L5A2 of the fifth lens element L5 may be concave. The periphery region L5A2P of the image-side surface L5A2 of the fifth lens element L5 may be convex.

The aspherical surfaces including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, and the object-side surface L5A1 and the image-side surface L5A2 of the fifth lens element L5 may all be defined by the following aspherical formula (1):

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ level.

The values of each aspherical parameter are shown in FIG. 9.

FIG. 7(a) shows a longitudinal spherical aberration for three representative wavelengths (470 nm, 555 nm and 650 nm), wherein the vertical axis of FIG. 7(a) defines the field of view. FIG. 7(b) shows the field curvature aberration in the sagittal direction for three representative wavelengths (470 nm, 555 nm and 650 nm), wherein the vertical axis of FIG. 7(b) defines the image height. FIG. 7(c) shows the field curvature aberration in the tangential direction for three representative wavelengths (470 nm, 555 nm and 650 nm), wherein the vertical axis of FIG. 7(c) defines the image height. FIG. 7(d) shows a variation of the distortion aberration, wherein the vertical axis of FIG. 7(d) defines the image height. The three curves with different wavelengths (470 nm, 555 nm and 650 nm) may represent that off-axis light with respect to these wavelengths may be focused around an image point. From the vertical deviation of each curve shown in FIG. 7(a), the offset of the off-axis light relative to the image point may be within about ±0.03 mm. Therefore, the first embodiment may improve the longitudinal spherical aberration with respect to different wavelengths. Referring to FIG. 7(b), the focus variation with respect to the three different wavelengths (470 nm, 555 nm and 650 nm) in the whole field may fall within about ±0.06 mm. Referring to FIG. 7(c), the focus variation with respect to the three different wavelengths (470 nm, 555 nm and 650 nm) in the whole field may fall within about ±0.08 mm. Referring to FIG. 7(d), and more specifically the horizontal axis of FIG. 7(d), the variation of the distortion aberration may be within about ±1%.

As shown in FIG. 8, the distance from the object-side surface L1A1 of the first lens element L1 to the image plane IMA along the optical axis (TTL) may be about 11.209 mm, Fno may be about 3.150, HFOV may be about 11.864 degrees, the effective focal length (EFL) of the optical imaging lens 1 may be about 11.799 mm, and the image height of the optical imaging lens 1 may be about 2.502 mm. In accordance with these values, the present embodiment may provide an optical imaging lens 1 having a shortened length for telephoto lens and an increased aperture while improving optical performance.

Please refer to FIG. 50A for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 10:
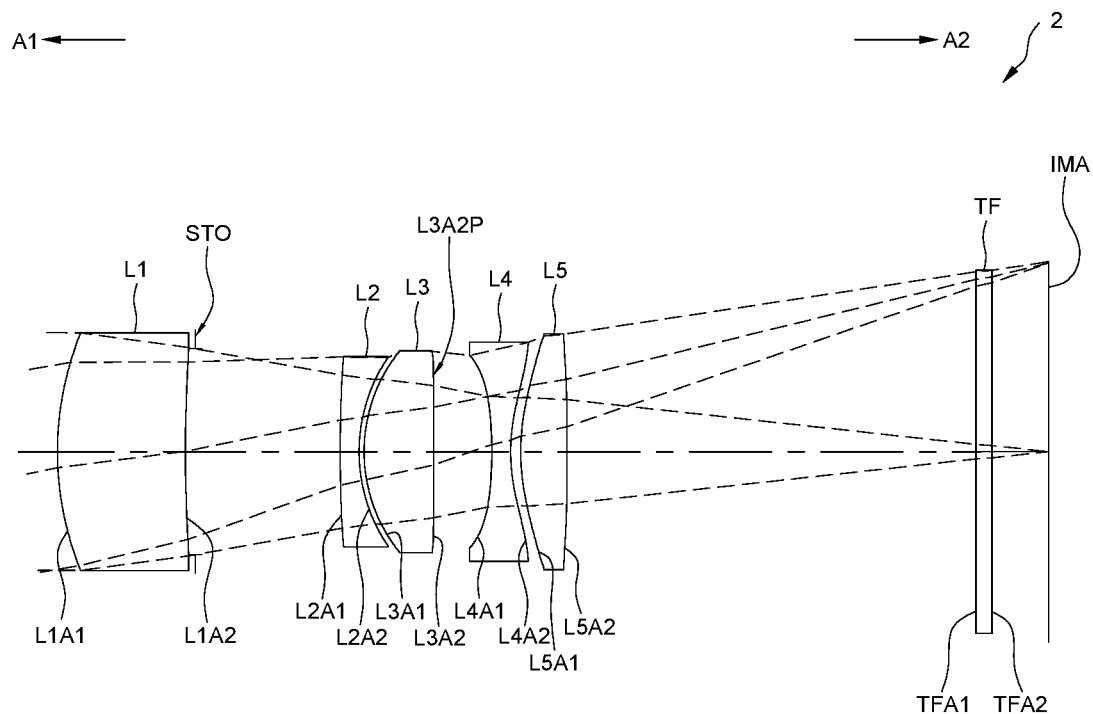
FIG. 10 depicts a cross-sectional view of the optical imaging lens according to the second embodiment of the present disclosure.
Figure 11:
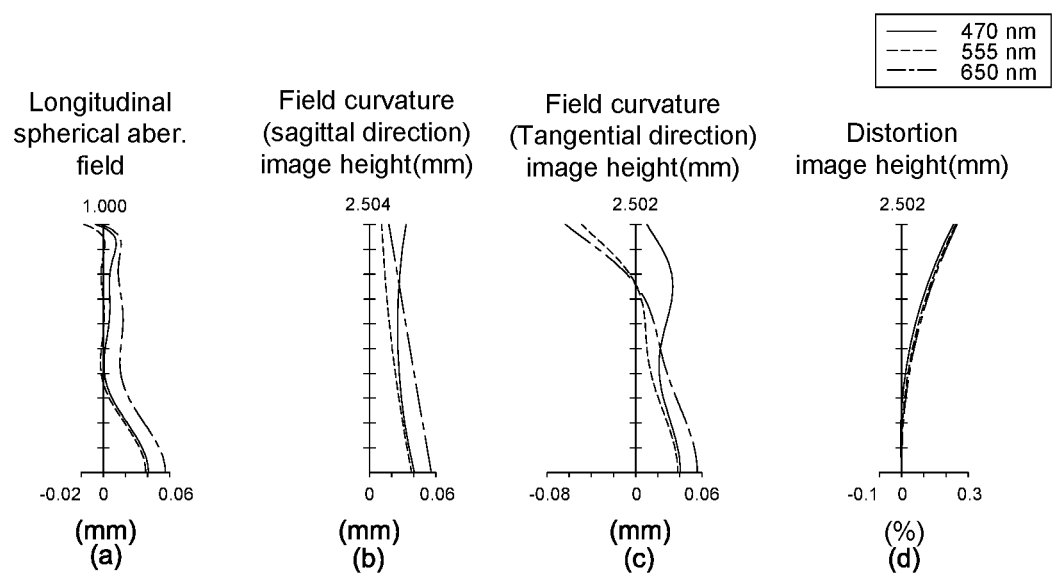
FIG. 11 depicts a chart of a longitudinal spherical aberration and other kinds of optical aberrations of the optical imaging lens according to the second embodiment of the present disclosure.

Reference is now made to FIGS. 10-13. FIG. 10 illustrates an example cross-sectional view of an optical imaging lens 2 according to a second example embodiment. FIG. 11 shows example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5.

The arrangement of the convex or concave surface structures, including the object-side surfaces L1A1, L2A1, L3A1, L4A1, and L5A1 and the image-side surfaces L1A2, L2A2, L4A2, and L5A2 may be generally similar to the optical imaging lens 1, but the differences between the optical imaging lens 1 and the optical imaging lens 2 may include the concave or concave surface structures of the image-side surface L3A2, a radius of curvature, a thickness, aspherical data, and/or an effective focal length of each lens element. More specifically, the periphery region L3A2P of the image-side surface L3A2 of the third lens element L3 of the optical imaging lens 2 may be convex.

Here, in the interest of clearly showing the drawings of the present embodiment, only the surface shapes which are different from that in the first embodiment may be labeled. Please refer to FIG. 12 for the optical characteristics of each lens element in the optical imaging lens 2 of the present embodiment.

From the vertical deviation of each curve shown in FIG. 11(a), the offset of the off-axis light relative to the image point may be within about ±0.06 mm. Referring to FIG. 11(b), the focus variation with respect to the three different wavelengths (470 nm, 555 nm and 650 nm) in the whole field may fall within about ±0.06 mm. Referring to FIG. 11(c), the focus variation with respect to the three different wavelengths (470 nm, 555 nm and 650 nm) in the whole field may fall within about ±0.08 mm. Referring to FIG. 11(d), the variation of the distortion aberration of the optical imaging lens 2 may be within about ±0.3%.

In comparison with the first embodiment, the distortion aberration in the second embodiment may be smaller, and system focal length of the optical imaging lens 2 may be longer as shown in FIG. 11 and FIG. 12. Moreover, the optical imaging lens 2 may be easier to be manufactured, such that yield thereof may be higher.

Please refer to 50A for the values of T1, G12, T2, G23, T3, G34, T4, G45, T5, G5F TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 14:
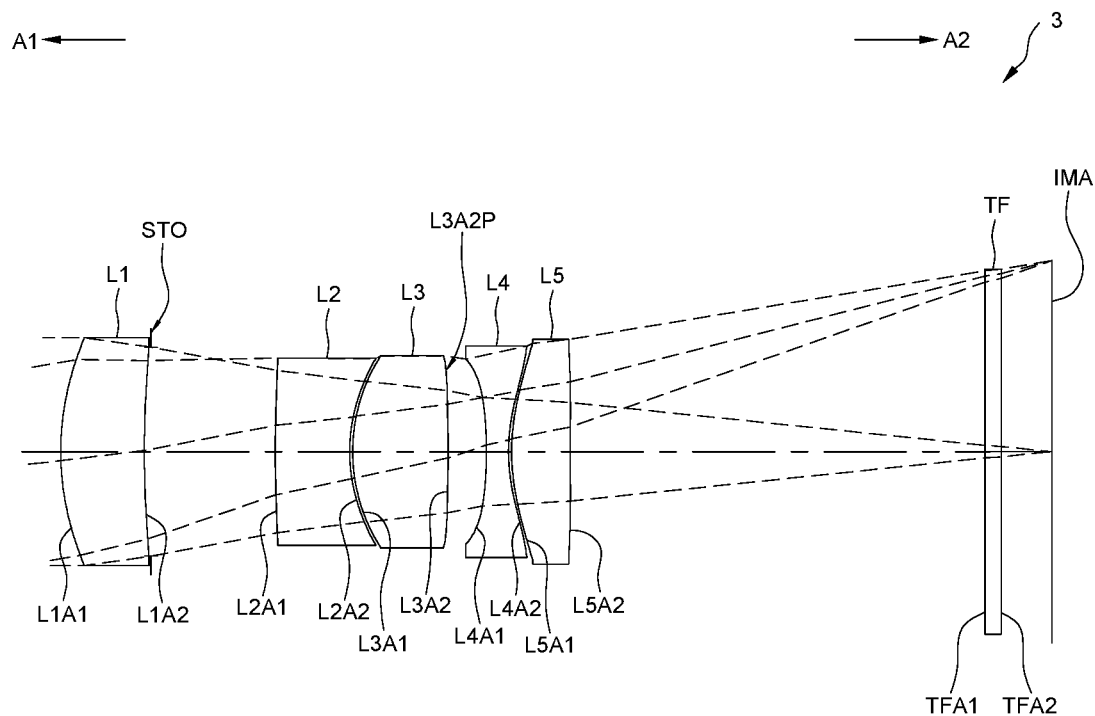
FIG. 14 depicts a cross-sectional view of the optical imaging lens according to the third embodiment of the present disclosure.
Figure 15:
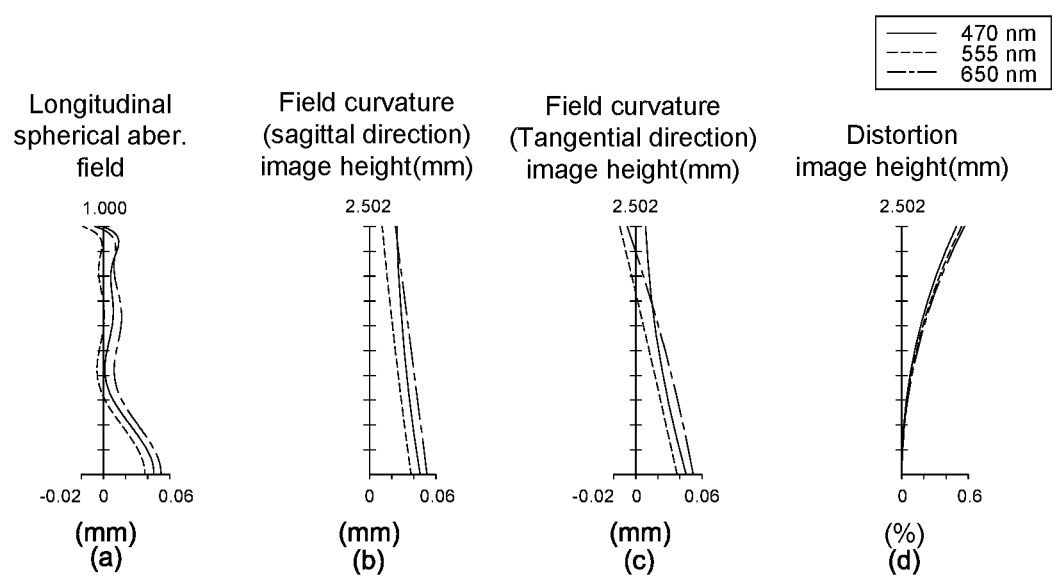
FIG. 15 depicts a chart of a longitudinal spherical aberration and other kinds of optical aberrations the optical imaging lens according to the third embodiment of the present disclosure.

Reference is now made to FIGS. 14-17. FIG. 14 illustrates an example cross-sectional view of an optical imaging lens 3 according to a third example embodiment. FIG. 15 shows example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment.

As shown in FIG. 14, the optical imaging lens 3 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5.

The arrangement of the convex or concave surface structures, including the object-side surfaces L1A1, L2A1, L3A1, L4A1, and L5A1 and the image-side surfaces L1A2, L2A2, L4A2, and L5A2 may be generally similar to the optical imaging lens 1, but the differences between the optical imaging lens 1 and the optical imaging lens 3 may include the concave or concave surface structures of the image-side surface L3A2, a radius of curvature, a thickness, aspherical data, and/or an effective focal length of each lens element. More specifically, the periphery region L3A2P of the image-side surface L3A2 of the third lens element L3 of the optical imaging lens 3 may be convex.

Here, in the interest of clearly showing the drawings of the present embodiment, only the surface shapes which are different from that in the first embodiment may be labeled. Please refer to FIG. 16 for the optical characteristics of each lens element in the optical imaging lens 3 of the present embodiment.

From the vertical deviation of each curve shown in FIG. 15($a$), the offset of the off-axis light relative to the image point may be within about ±0.06 mm. Referring to FIG. 15($b$), the focus variation with respect to the three different wavelengths (470 nm, 555 nm and 650 nm) in the whole field may fall within about ±0.06 mm. Referring to FIG. 15($c$), the focus variation with respect to the three different wavelengths (470 nm, 555 nm and 650 nm) in the whole field may fall within about ±0.06 mm. Referring to FIG. 15($d$), the variation of the distortion aberration of the optical imaging lens 3 may be within about ±0.6%.

In comparison with the first embodiment, the system focal length of the optical imaging lens 3 may be longer, and the field curvature aberration in the tangential direction and the distortion aberration of the optical imaging lens 3 may be smaller as shown in FIG. 15 and FIG. 16. Moreover, the optical imaging lens 3 may be easier to be manufactured, such that yield thereof may be higher.

Please refer to FIG. 50A for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 18:
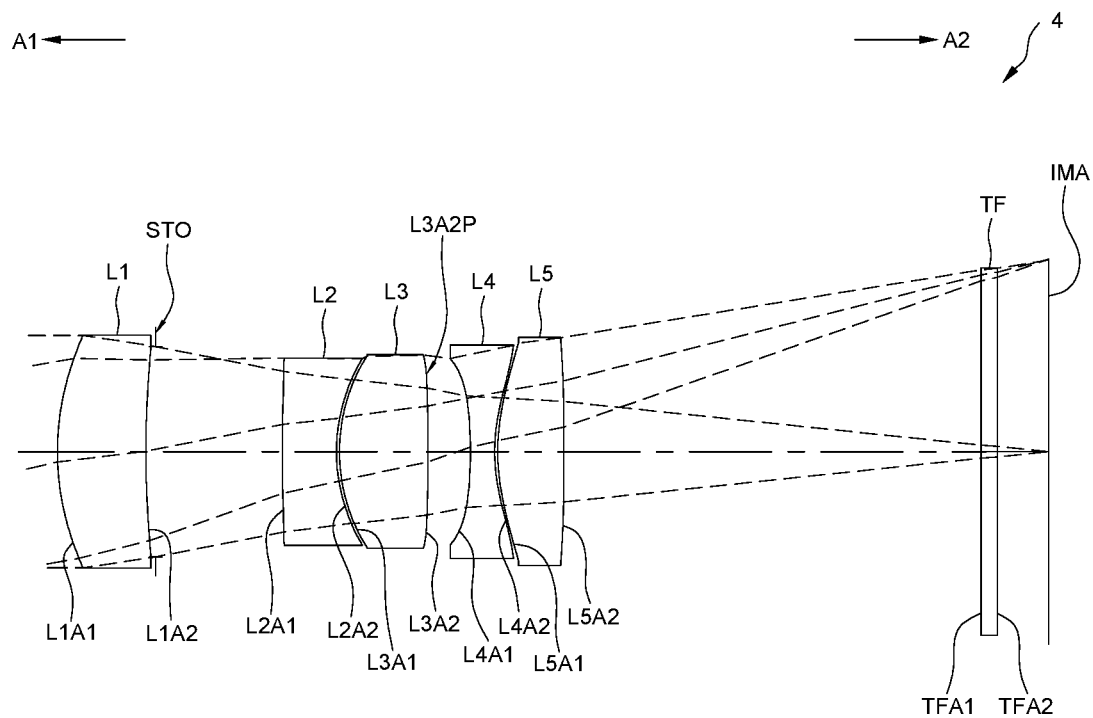
FIG. 18 depicts a cross-sectional view of the optical imaging lens according to the fourth embodiment of the present disclosure.
Figure 19:
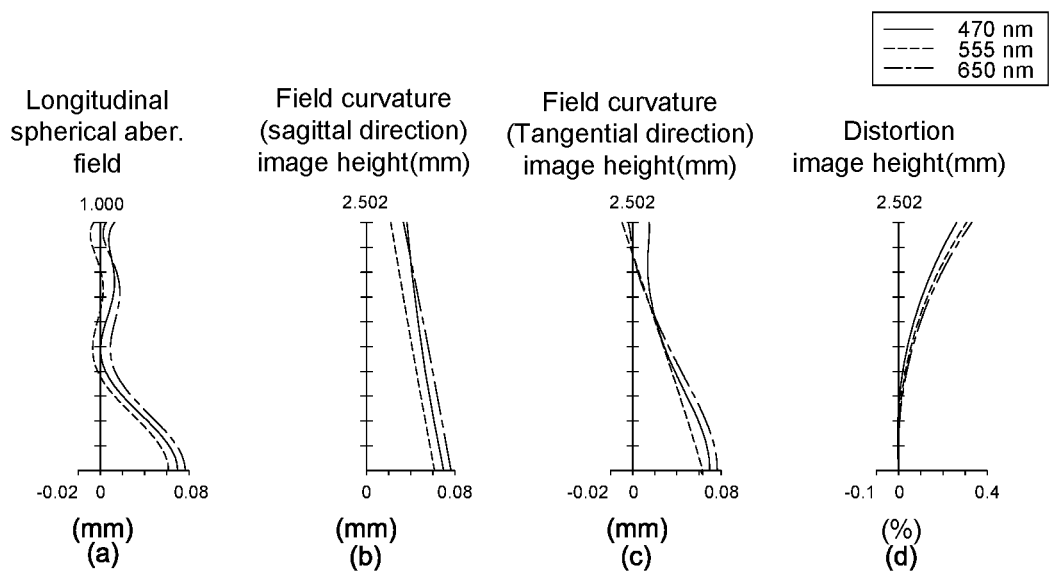
FIG. 19 depicts a chart of a longitudinal spherical aberration and other kinds of optical aberrations of the optical imaging lens according to the fourth embodiment of the present disclosure.

Reference is now made to FIGS. 18-21. FIG. 18 illustrates an example cross-sectional view of an optical imaging lens 4 according to a fourth example embodiment. FIG. 19 shows example charts of a longitudinal spherical aberration and other kinds of optical aberrations of the optical imaging lens 4 according to the fourth example embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5.

The arrangement of the convex or concave surface structures, including the object-side surfaces L1A1, L2A1, L3A1, L4A1, and L5A1 and the image-side surfaces L1A2, L2A2, L4A2, and L5A2 may be generally similar to the optical imaging lens 1, but the differences between the optical imaging lens 1 and the optical imaging lens 4 may include the concave or concave surface structures of the image-side surface L3A2, a radius of curvature, a thickness, aspherical data, and/or an effective focal length of each lens element. More specifically, the periphery region L3A2P of the image-side surface L3A2 of the third lens element L3 of the optical imaging lens 4 may be convex.

Here, in the interest of clearly showing the drawings of the present embodiment, only the surface shapes which are different from that in the first embodiment may be labeled. Please refer to FIG. 20 for the optical characteristics of each lens element in the optical imaging lens 4 of the present embodiment.

From the vertical deviation of each curve shown in FIG. 19($a$), the offset of the off-axis light relative to the image point may be within about ±0.08 mm. Referring to FIG. 19($b$), the focus variation with respect to the three different wavelengths (470 nm, 555 nm and 650 nm) in the whole field may fall within about ±0.08 mm. Referring to FIG. 19($c$), the focus variation with respect to the three different wavelengths (470 nm, 555 nm and 650 nm) in the whole field may fall within about ±0.08 mm. Referring to FIG. 19($d$), the variation of the distortion aberration of the optical imaging lens 4 may be within about ±0.4%.

In comparison with the first embodiment, the system focal length of the optical imaging lens 4 may be longer, and the distortion aberration of the optical imaging lens 4 may be smaller as shown in FIG. 19 and FIG. 20. Moreover, the optical imaging lens 4 may be easier to be manufactured, such that yield thereof may be higher.

Please refer to FIG. 50A for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 22:
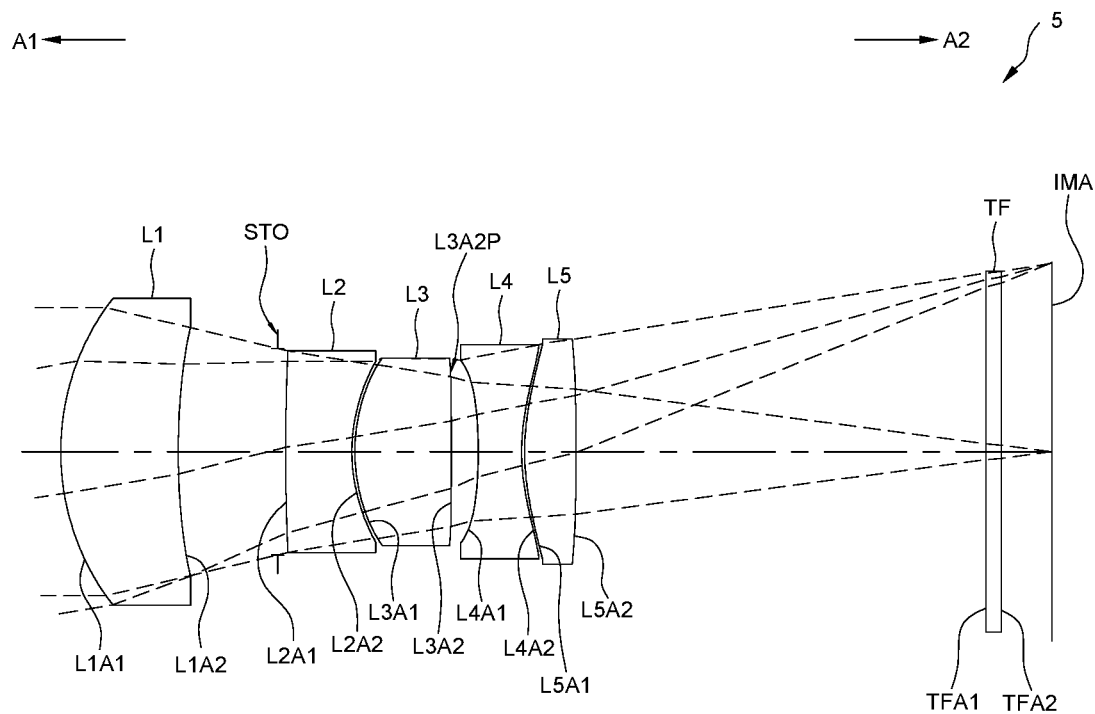
FIG. 22 depicts a cross-sectional view of the optical imaging lens according to the fifth embodiment of the present disclosure.
Figure 23:
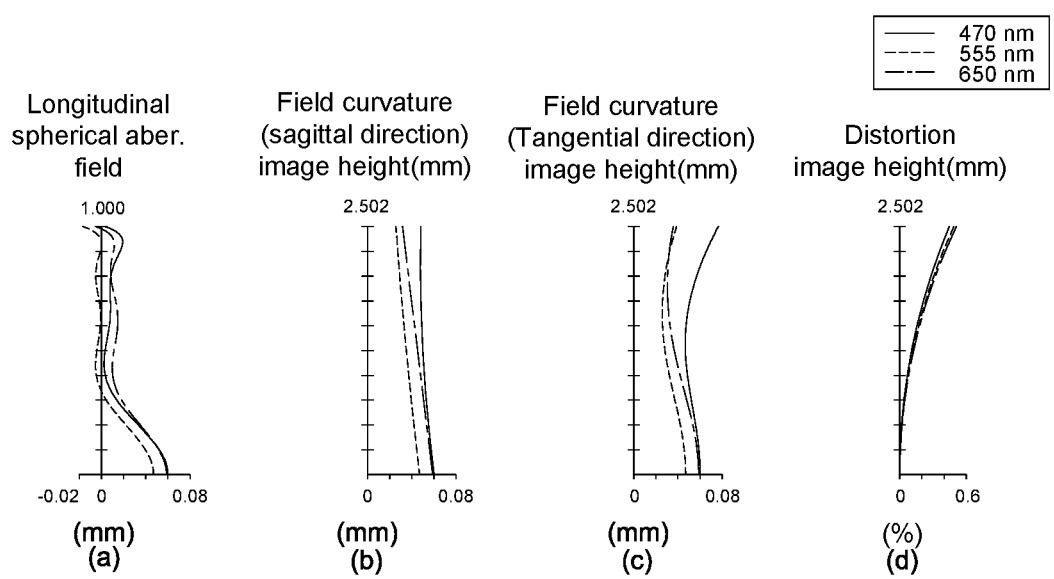
FIG. 23 depicts a chart of a longitudinal spherical aberration and other kinds of optical aberrations of the optical imaging lens according to the fifth embodiment of the present disclosure.

Reference is now made to FIGS. 22-25. FIG. 22 illustrates an example cross-sectional view of an optical imaging lens 5 according to a fifth example embodiment. FIG. 23 shows example charts of a longitudinal spherical aberration and other kinds of optical aberrations of the optical imaging lens 5 according to the fifth example embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22, the optical imaging lens 5 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5.

The arrangement of the convex or concave surface structures, including the object-side surfaces L1A1, L2A1, L3A1. L4A1, and L5A1 and the image-side surfaces L1A2, L2A2, L4A2, and L5A2 may be generally similar to the optical imaging lens 1, but the differences between the optical imaging lens 1 and the optical imaging lens 5 may include the concave or concave surface structures of the image-side surface L3A2, a radius of curvature, a thickness, aspherical data, and/or an effective focal length of each lens element. More specifically, the periphery region L3A2P of the image-side surface L3A2 of the third lens element L3 of the optical imaging lens 5 may be convex.

Here, in the interest of clearly showing the drawings of the present embodiment, only the surface shapes which are different from that in the first embodiment may be labeled. Please refer to FIG. 24 for the optical characteristics of each lens element in the optical imaging lens 5 of the present embodiment.

From the vertical deviation of each curve shown in FIG. 23(a), the offset of the off-axis light relative to the image point may be within about ±0.08 mm. Referring to FIG. 23(b), the focus variation with respect to the three different wavelengths (470 nm, 555 nm and 650 nm) in the whole field may fall within about ±0.08 mm. Referring to FIG. 23(c), the focus variation with respect to the three different wavelengths (470 nm, 555 nm and 650 nm) in the whole field may fall within about ±0.08 mm. Referring to FIG. 23(d), the variation of the distortion aberration of the optical imaging lens 5 may be within about ±0.6%.

In comparison with the first embodiment, the system focal length of the optical imaging lens 5 may be longer, and the distortion aberration of the optical imaging lens 5 may be smaller as shown in FIG. 23 and FIG. 24. Moreover, the optical imaging lens 5 may be easier to be manufactured, such that yield thereof may be higher.

Please refer to FIG. 50B for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4),(T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 26:
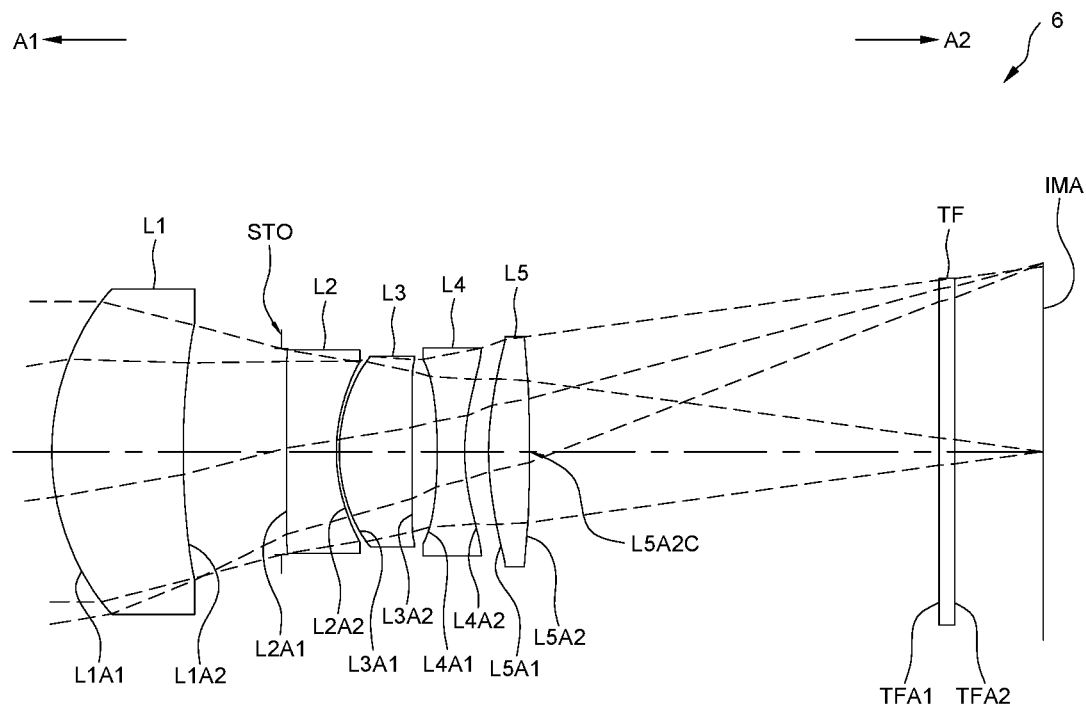
FIG. 26 depicts a cross-sectional view of the optical imaging lens according to the sixth embodiment of the present disclosure.
Figure 27:
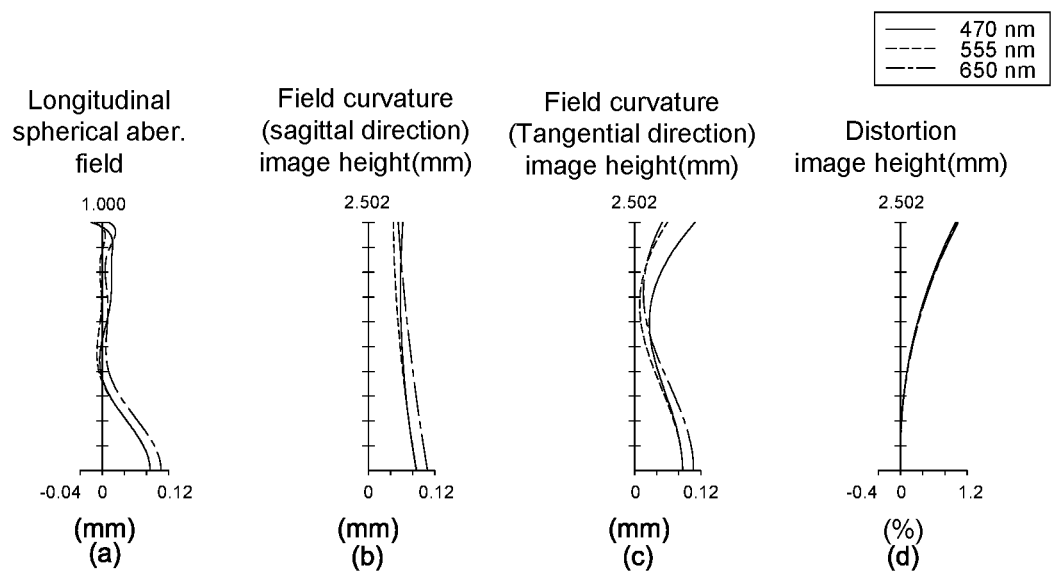
FIG. 27 depicts a chart of a longitudinal spherical aberration and other kinds of optical aberrations of the optical imaging lens according to the sixth embodiment of the present disclosure.

Reference is now made to FIGS. 26-29. FIG. 26 illustrates an example cross-sectional view of an optical imaging lens 6 according to a sixth example embodiment. FIG. 27 shows example charts of a longitudinal spherical aberration and other kinds of optical aberrations of the optical imaging lens 6 according to the sixth example embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26, the optical imaging lens 6 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5.

The arrangement of the convex or concave surface structures, including the object-side surfaces L1A1, L2A1, L3A1, L4A1, and L5A1 and the image-side surfaces L1A2, L2A2, L3A2, and L4A2 may be generally similar to the optical imaging lens 1, but the differences between the optical imaging lens 1 and the optical imaging lens 6 may include the concave or concave surface structures of the image-side surface L5A2, a radius of curvature, a thickness, aspherical data, and/or an effective focal length of each lens element. More specifically, the optical axis region L5A2C of the object-side surface L5A2 of the fifth lens element L5 of the optical imaging lens 6 may be convex.

Here, in the interest of clearly showing the drawings of the present embodiment, only the surface shapes which are different from that in the first embodiment may be labeled. Please refer to FIG. 28 for the optical characteristics of each lens element in the optical imaging lens 6 of the present embodiment.

From the vertical deviation of each curve shown in FIG. 27(a), the offset of the off-axis light relative to the image point may be within about ±0.12 mm. Referring to FIG. 27(b), the focus variation with respect to the three different wavelengths (470 nm, 555 nm and 650 nm) in the whole field may fall within about ±0.12 mm. Referring to FIG. 27(c), the focus variation with respect to the three different wavelengths (470 nm, 555 nm and 650 nm) in the whole field may fall within about ±0.12 mm. Referring to FIG. 27(d), the variation of the distortion aberration of the optical imaging lens 6 may be within about ±1.2%.

In comparison with the first embodiment, the system focal length of the optical imaging lens 6 may be longer as shown in FIG. 27 and FIG. 28. Moreover, the optical imaging lens 6 may be easier to be manufactured, such that yield thereof may be higher.

Please refer to FIG. 50B for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4),(T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 30:
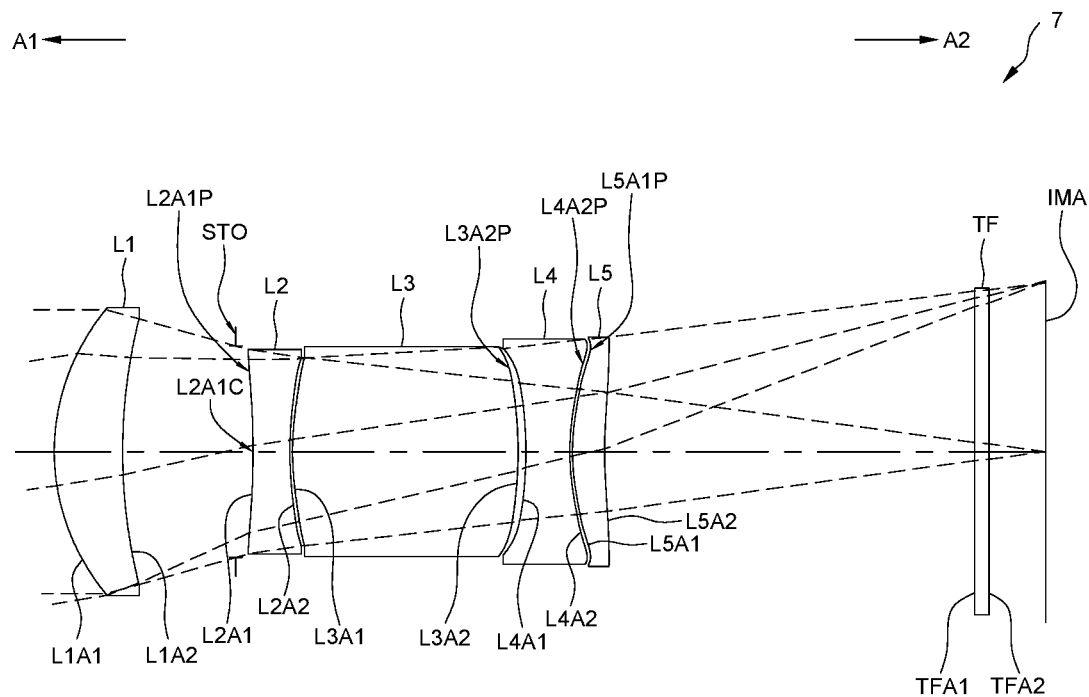
FIG. 30 depicts a cross-sectional view of the optical imaging lens according to the seventh embodiment of the present disclosure.
Figure 31:
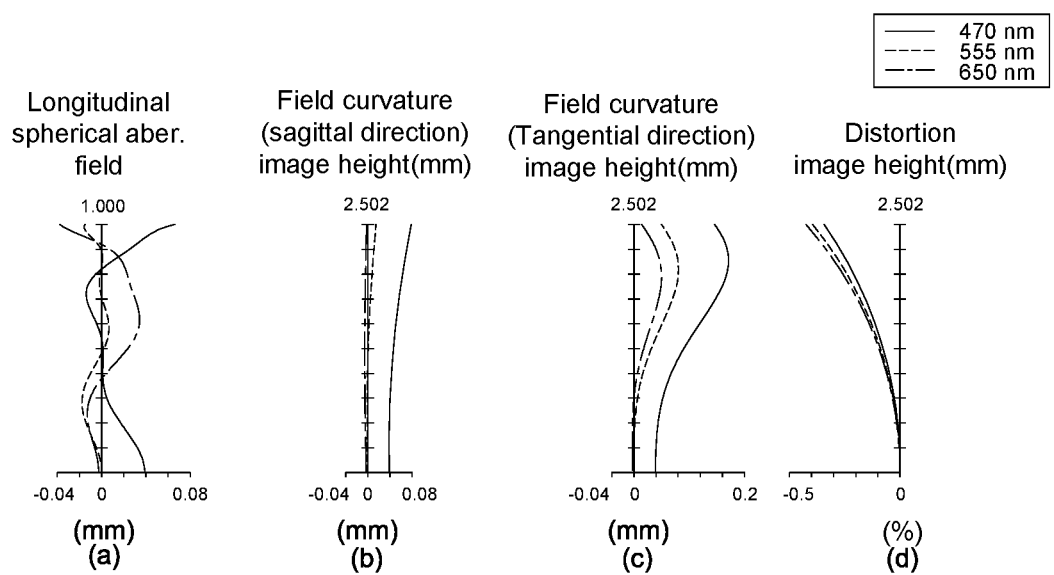
FIG. 31 depicts a chart of a longitudinal spherical aberration and other kinds of optical aberrations of the optical imaging lens according to the seventh embodiment of the present disclosure.

Reference is now made to FIGS. 30-33. FIG. 30 illustrates an example cross-sectional view of an optical imaging lens 7 according to a seventh example embodiment. FIG. 31 shows example charts of a longitudinal spherical aberration and other kinds of optical aberrations of the optical imaging lens 7 according to the seventh example embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30, the optical imaging lens 7 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5.

The arrangement of the convex or concave surface structures, including the object-side surfaces L1A1, L3A1, and L4A1 and the image-side surfaces L1A2, L2A2, and L5A2 may be generally similar to the optical imaging lens 1, but the differences between the optical imaging lens 1 and the optical imaging lens 7 may include the concave or concave surface structures of the object-side surfaces L2A1 and L5A1, the concave or concave surface structures of the image-side surfaces L3A2 and L4A2, a radius of curvature, a thickness, aspherical data, and/or an effective focal length of each lens element. More specifically, the optical axis region L2A1C and the periphery region L2A1P of the object-side surface L2A1 of the second lens element L2 and the periphery region L5A1P of the object-side surface L5A1 of the fifth lens element L5 of the optical imaging lens 7 may be concave, and the periphery region L3A2P of the image-side surface L3A2 of the third lens element L3 and the periphery region L4A2P of the image-side surface L4A2 of the fourth lens element L4 may be convex.

Here, in the interest of clearly showing the drawings of the present embodiment, only the surface shapes which are different from that in the first embodiment may be labeled. Please refer to FIG. 32 for the optical characteristics of each lens element in the optical imaging lens 7 of the present embodiment.

From the vertical deviation of each curve shown in FIG. 31(a), the offset of the off-axis light relative to the image point may be within about ±0.08 mm. Referring to FIG. 31(b), the focus variation with respect to the three different wavelengths (470 nm, 555 nm and 650 nm) in the whole field may fall within about ±0.08 mm. Referring to FIG. 31(c), the focus variation with respect to the three different wavelengths (470 nm, 555 nm and 650 nm) in the whole field may fall within about ±0.2 mm. Referring to FIG. 31(d), the variation of the distortion aberration of the optical imaging lens 7 may be within about ±0.5%.

In comparison with the first embodiment, the system focal length of the optical imaging lens 7 may be longer, and the distortion aberration of the optical imaging lens 7 may be smaller as shown in FIG. 31 and FIG. 32. Moreover, the optical imaging lens 7 may be easier to be manufactured, such that yield thereof may be higher.

Please refer to FIG. 50B for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4),(T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 34:
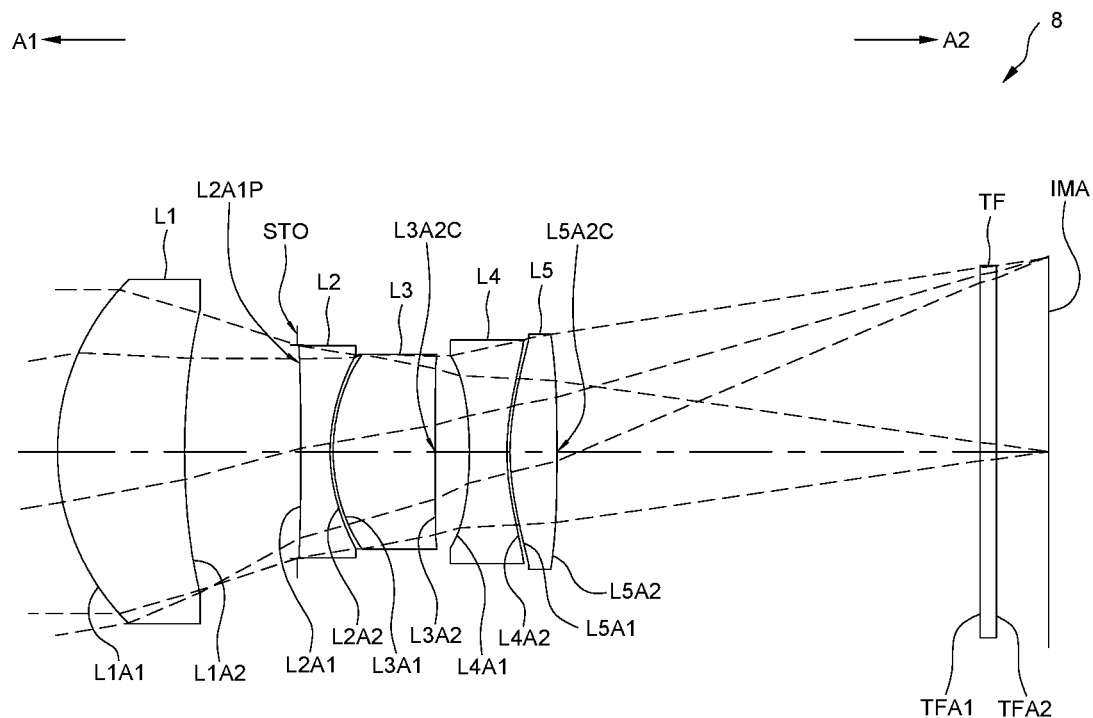
FIG. 34 depicts a cross-sectional view of the optical imaging lens according to the eighth embodiment of the present disclosure.
Figure 35:
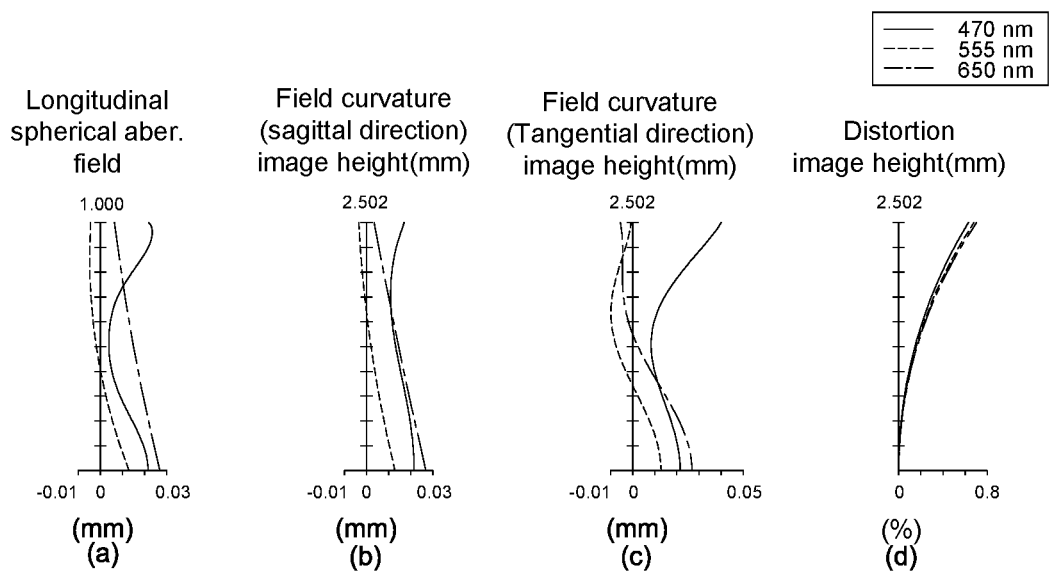
FIG. 35 depicts a chart of a longitudinal spherical aberration and other kinds of optical aberrations of the optical imaging lens according to the eighth embodiment of the present disclosure.

Reference is now made to FIGS. 34-37. FIG. 34 illustrates an example cross-sectional view of an optical imaging lens 8 according to an eighth example embodiment. FIG. 35 shows example charts of a longitudinal spherical aberration and other kinds of optical aberrations of the optical imaging lens 8 according to the eighth example embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34, the optical imaging lens 8 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5.

The arrangement of the convex or concave surface structures, including the object-side surfaces L1A1, L3A1, L4A1 and L5A1 and the image-side surfaces L1A2, L2A2, and L4A2 may be generally similar to the optical imaging lens 1, but the differences between the optical imaging lens 1 and the optical imaging lens 8 may include the concave or concave surface structures of the object-side surface L2A1, the concave or concave surface structures of the image-side surfaces L3A2 and L5A2, a radius of curvature, a thickness, aspherical data, and/or an effective focal length of each lens element. More specifically, the periphery region L2A1P of the object-side surface L2A1 of the second lens element L2 and the optical axis region L3A2C of the image-side surface L3A2 of the third lens element L3 of the optical imaging lens 8 may be concave, and the optical axis region L5A2C of the image-side surface L5A2 of the fifth lens element L5 of the optical imaging lens 8 may be convex.

Here, in the interest of clearly showing the drawings of the present embodiment, only the surface shapes which are different from that in the first embodiment may be labeled. Please refer to FIG. 36 for the optical characteristics of each lens element in the optical imaging lens 8 of the present embodiment.

From the vertical deviation of each curve shown in FIG. 35(a), the offset of the off-axis light relative to the image point may be within about ±0.03 mm. Referring to FIG. 35(b), the focus variation with respect to the three different wavelengths (470 nm, 555 nm and 650 nm) in the whole field may fall within about ±0.03 mm. Referring to FIG. 35(c), the focus variation with respect to the three different wavelengths (470 nm, 555 nm and 650 nm) in the whole field may fall within about ±0.05 mm. Referring to FIG. 35(d), the variation of the distortion aberration of the optical imaging lens 8 may be within about ±0.8%.

In comparison with the first embodiment, the distortion aberration, and the field curvature aberration in the sagittal direction and the tangential direction of the optical imaging lens 8 may be smaller, and the system focal length of the optical imaging lens 8 may be longer as shown in FIG. 35 and FIG. 36. Moreover, the optical imaging lens 8 may be easier to be manufactured, such that yield thereof may be higher.

Please refer to FIG. 50B for the values of T1, G12, T2, G23, T3, G34, T4, G45, T5, G5F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4),(T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

Figure 38:
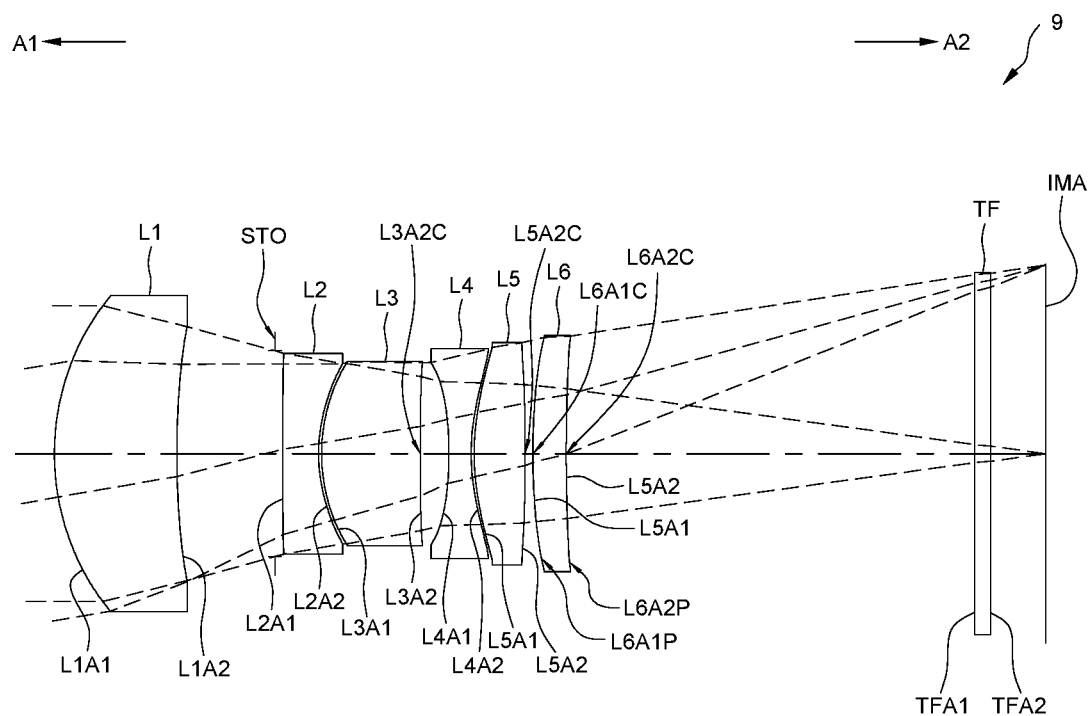
FIG. 38 depicts a cross-sectional view of the optical imaging lens according to the ninth embodiment of the present disclosure.
Figure 39:
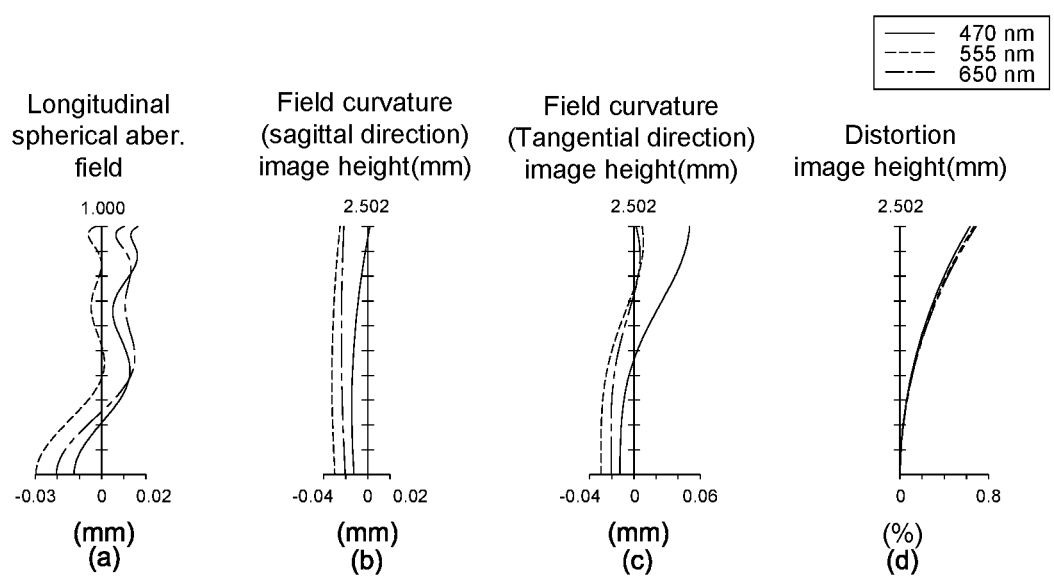
FIG. 39 depicts a chart of a longitudinal spherical aberration and other kinds of optical aberrations of the optical imaging lens according to the ninth embodiment of the present disclosure.

Reference is now made to FIGS. 38-41. FIG. 38 illustrates an example cross-sectional view of an optical imaging lens 9 according to a ninth example embodiment. FIG. 39 shows example charts of a longitudinal spherical aberration and other kinds of optical aberrations of the optical imaging lens 9 according to the ninth example embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38, the optical imaging lens 9 of the present embodiment, in an order from an object side A1 to an image side A2 along an optical axis, may comprise a first lens element L1, an aperture stop STO, a second lens element L2, a third lens element L3, a fourth lens element L4 and a fifth lens element L5. In comparison with the first embodiment, the optical imaging lens 9 may further comprise a sixth lens element L6 disposed between the fifth lens element L5 and the image plane IMA. The sixth lens element L6 may have positive refracting power. Both of the optical axis region L6A1C and the peripheral region L6A1P of the object-side surface L6A1 of the sixth lens element L6 may be convex, and both of the optical axis region L6A2C and the peripheral region L6A2P of the image-side surface L6A2 of the sixth lens element L6 may be concave.

The arrangement of the convex or concave surface structures, including the object-side surfaces L1A1, L2A1, L3A1, L4A1, and L5A1 and the image-side surfaces L1A2, L2A2, and L4A2 may be generally similar to the optical imaging lens 1, but the differences between the optical imaging lens 1 and the optical imaging lens 9 may include the concave or concave surface structures of the image-side surfaces L3A2 and L5A2, a radius of curvature, a thickness, aspherical data, and/or an effective focal length of each lens element. More specifically, the optical axis region L3A2C of the image-side surface L3A2 of the third lens element L3 of the optical imaging lens 9 may be concave, and the optical axis region L5A2C of the image-side surface L5A2 of the fifth lens element L5 of the optical imaging lens 9 may be convex.

Here, in the interest of clearly showing the drawings of the present embodiment, only the surface shapes which are different from that in the first embodiment may be labeled. Please refer to FIG. 40 for the optical characteristics of each lens element in the optical imaging lens 9 of the present embodiment.

From the vertical deviation of each curve shown in FIG. 39(a), the offset of the off-axis light relative to the image point may be within about ±0.03 mm. Referring to FIG. 39(b), the focus variation with respect to the three different wavelengths (470 nm, 555 nm and 650 nm) in the whole field may fall within about ±0.04 mm. Referring to FIG. 39(c), the focus variation with respect to the three different wavelengths (470 nm, 555 nm and 650 nm) in the whole field may fall within about ±0.06 mm. Referring to FIG. 39(d), the variation of the distortion aberration of the optical imaging lens 9 may be within about ±0.8%.

In comparison with the first embodiment, the distortion aberration, and the field curvature aberration in the sagittal direction and the tangential direction of the optical imaging lens 9 may be smaller, and the system focal length of the optical imaging lens 9 may be larger as shown in FIG. 39 and FIG. 40. Moreover, the optical imaging lens 9 may be easier to be manufactured, such that yield thereof may be higher.

Please refer to FIG. 50C for the values of T1, G12, T2, G23, T3, G34, T4, G45, T5, G5F, G56, T6, G6F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), (G12+G45+T5)/(T4+G34) of the present embodiment.

Figure 42:
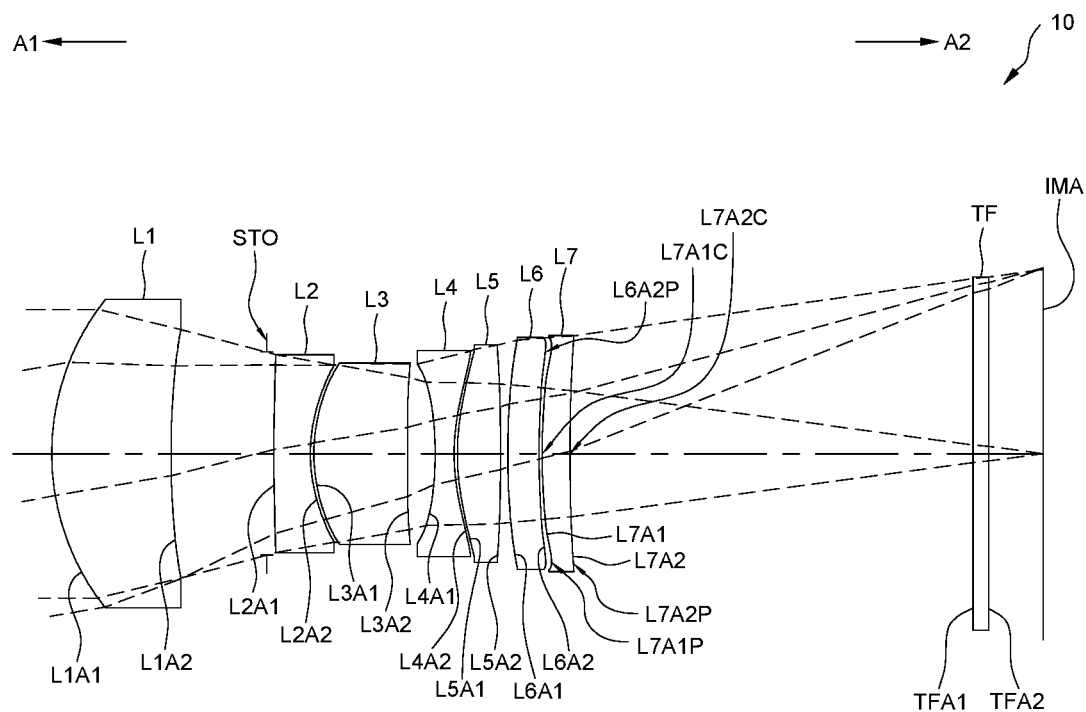
FIG. 42 depicts a cross-sectional view of the optical imaging lens according to the tenth embodiment of the present disclosure.
Figure 43:
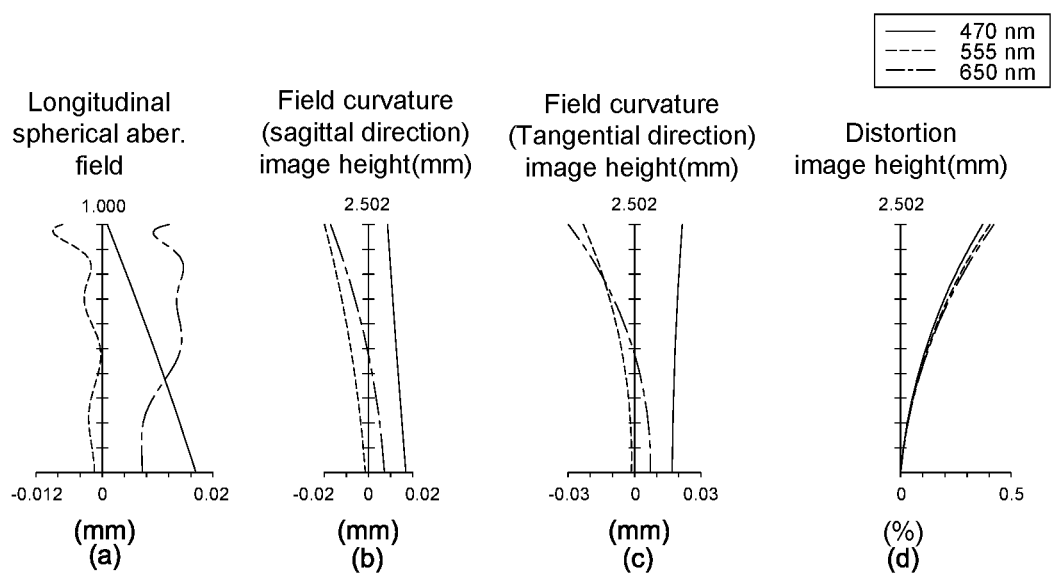
FIG. 43 depicts a chart of a longitudinal spherical aberration and other kinds of optical aberrations of the optical imaging lens according to the tenth embodiment of the present disclosure.

Reference is now made to FIGS. 42-45. FIG. 42 illustrates an example cross-sectional view of an optical imaging lens 10 according to a tenth example embodiment. FIG. 43 shows example charts of a longitudinal spherical aberration and other kinds of optical aberrations of the optical imaging lens 10 according to the tenth example embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment.

As shown in FIG. 42, the optical imaging lens 10 of the present embodiment, in an order from an object side A1 to an image side A2 along an optical axis, may comprise a first lens element L1, an aperture stop STO, a second lens element L2, a third lens element L3, a fourth lens element L4, a fifth lens element L5, and a sixth lens element L6. In comparison with the ninth embodiment, the optical imaging lens 10 may further comprise a seventh lens element L7 disposed between the sixth lens element L6 and the image plane IMA. The seventh lens element L7 may have positive refracting power. The optical axis region L7A1C of the object-side surface L7A1 of the seventh lens element L7 may be convex, and the peripheral region L7A1P of the object-side surface L7A1 of the seventh lens element L7 may be concave. Both of the optical axis region L7A2C and the peripheral region L7A2P of the image-side surface L7A2 of the seventh lens element L7 may be concave.

The arrangement of the convex or concave surface structures, including the object-side surfaces L1A1, L2A1, L3A1, L4A1, L5A1, and L6A1 and the image-side surfaces L1A2, L2A2, L3A2, L4A2, and L5A2 may be generally similar to the optical imaging lens 9, but the differences between the optical imaging lens 9 and the optical imaging lens 10 may include the concave or concave surface structures of the image-side surface L6A2, a radius of curvature, a thickness, aspherical data, and/or an effective focal length of each lens element. More specifically, the peripheral region L6A2P of the image-side surface L6A2 of the sixth lens element L6 of the optical imaging lens 10 may be convex.

Here, in the interest of clearly showing the drawings of the present embodiment, only the surface shapes which are different from that in the ninth embodiment may be labeled. Please refer to FIG. 44 for the optical characteristics of each lens element in the optical imaging lens 10 of the present embodiment.

From the vertical deviation of each curve shown in FIG. 43(a), the offset of the off-axis light relative to the image point may be within about ±0.02 mm. Referring to FIG. 43(b), the focus variation with respect to the three different wavelengths (470 nm, 555 nm and 650 nm) in the whole field may fall within about ±0.02 mm. Referring to FIG. 43(c), the focus variation with respect to the three different wavelengths (470 nm, 555 nm and 650 nm) in the whole field may fall within about ±0.03 mm. Referring to FIG. 43(d), the variation of the distortion aberration of the optical imaging lens 10 may be within about ±0.5%.

In comparison with the ninth embodiment, the distortion aberration, and the field curvature aberration in the sagittal direction and the tangential direction of the optical imaging lens 10 may be smaller, and the system focal length of the optical imaging lens 10 as shown in FIG. 43 and FIG. 44. Moreover, the optical imaging lens 10 may be easier to be manufactured, such that yield thereof may be higher.

Please refer to FIG. 50C for the values of T1, G12, T2, G23, T3, G34, T4, G45, T5, G5F, G56, T6, G6F, G67, T7, G7F, TTF, GFP, AAG, ALT, BFL, TL, (T2+G23+T3+G34+T4+G45+T5)/G12, HFOV/Fno, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), (G12+G45+T5)/(T4+G34) of the present embodiment.

Figure 46:
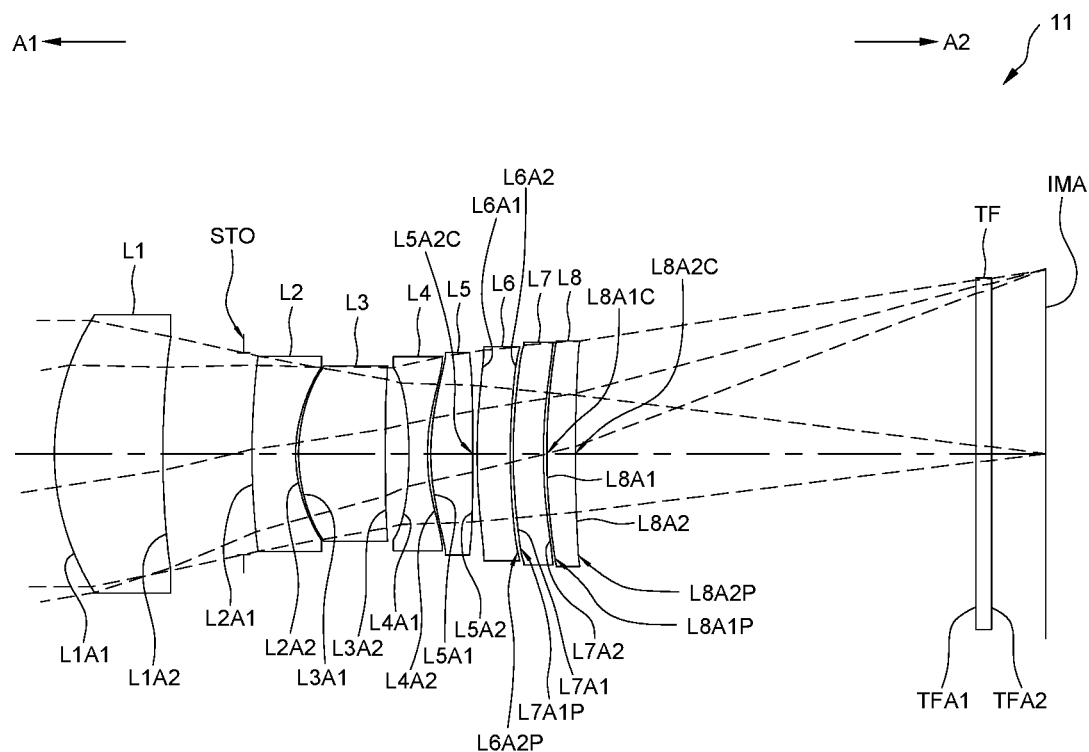
FIG. 46 depicts a cross-sectional view of the optical imaging lens according to the eleventh embodiment of the present disclosure.
Figure 47:
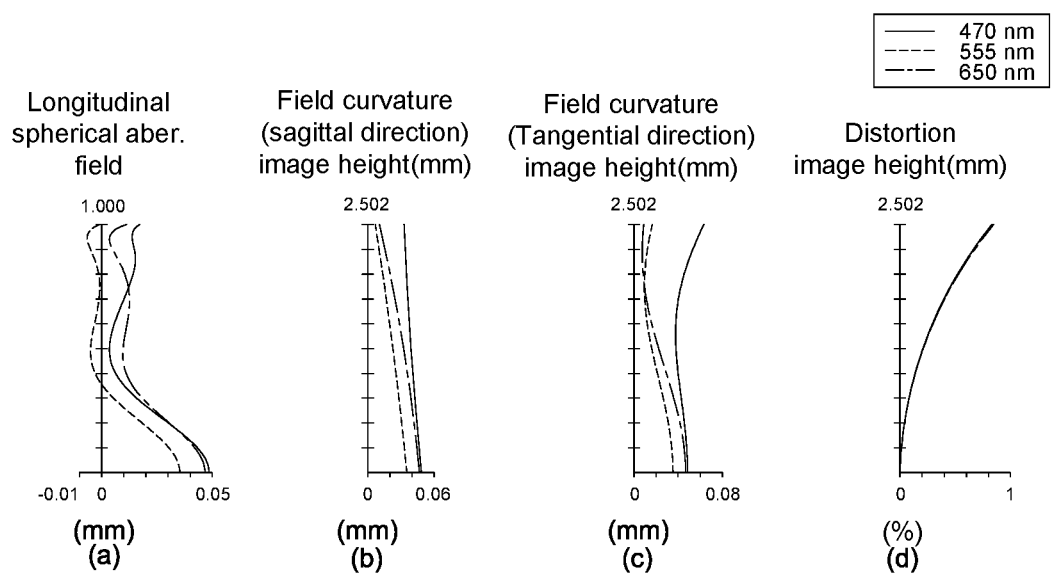
FIG. 47 depicts a chart of a longitudinal spherical aberration and other kinds of optical aberrations of the optical imaging lens according to the eleventh embodiment of the present disclosure.

Reference is now made to FIGS. 46-49. FIG. 46 illustrates an example cross-sectional view of an optical imaging lens 11 according to an eleventh example embodiment. FIG. 47 shows example charts of a longitudinal spherical aberration and other kinds of optical aberrations of the optical imaging lens 11 according to the eleventh example embodiment. FIG. 48 shows an example table of optical data of each lens element of the optical imaging lens 11 according to the eleventh example embodiment. FIG. 49 shows an example table of aspherical data of the optical imaging lens 11 according to the eleventh example embodiment.

As shown in FIG. 46, the optical imaging lens 11 of the present embodiment, in an order from an object side A1 to an image side A2 along an optical axis, may comprise a first lens element L1, an aperture stop STO, a second lens element L2, a third lens element L3, a fourth lens element L4, a fifth lens element L5, a sixth lens element L6 and a seventh lens element L7. In comparison with the tenth embodiment, the optical imaging lens 11 may further comprise a eighth lens element L8 disposed between the seventh lens element L7 and the image plane IMA. The eighth lens element L8 may have positive refracting power. Both of the optical axis region L8A1C and the peripheral region L8A1P of the object-side surface L8A1 of the eighth lens element L8 may be convex. Both of the optical axis region L8A2C and the peripheral region L8A2P of the image-side surface L8A2 of the eighth lens element L8 may be concave.

The arrangement of the convex or concave surface structures, including the object-side surfaces L1A1, L2A1, L3A1, L4A1, L5A1, and L6A1 and the image-side surfaces L1A2, L2A2, L3A2, L4A2, and L7A2 may be generally similar to the optical imaging lens 10, but the differences between the optical imaging lens 10 and the optical imaging lens 11 may include the refracting power of the seventh lens element L7, the concave or concave surface structures of the object-side surface L7A1, the concave or concave surface structures of the image-side surfaces L5A2 and L6A2, a radius of curvature, a thickness, aspherical data, and/or an effective focal length of each lens element. More specifically, the optical axis region L5A2C of the image-side surface L5A2 of the fifth lens element L5 and the peripheral region L6A2P of the image-side surface L6A2 of the sixth lens element L6 of the optical imaging lens 11 may be concave, the peripheral region L7A1P of the object-side surface L7A1 of the seventh lens element L7 may be convex, and the seventh lens element L7 may have negative refracting power.

Here, in the interest of clearly showing the drawings of the present embodiment, only the surface shapes which are different from that in the tenth embodiment may be labeled. Please refer to FIG. 48 for the optical characteristics of each lens element in the optical imaging lens 11 of the present embodiment.

From the vertical deviation of each curve shown in FIG. 47(a), the offset of the off-axis light relative to the image point may be within about ±0.05 mm. Referring to FIG. 47(b), the focus variation with respect to the three different wavelengths (470 nm, 555 nm and 650 nm) in the whole field may fall within about ±0.06 mm. Referring to FIG. 47(c), the focus variation with respect to the three different wavelengths (470 nm, 555 nm and 650 nm) in the whole field may fall within about ±0.08 mm. Referring to FIG. 47(d), the variation of the distortion aberration of the optical imaging lens 11 may be within about ±1%.

In comparison with the tenth embodiment, the optical imaging lens 11 may be easier to be manufactured, such that yield thereof may be higher as shown in FIG. 47 and FIG. 48.

Please refer to FIG. 50C for the values of T1, G12, T2, G23, T3, G34, T4, G45, T5, G5F, G56, T6, G6F, G67, T7, G7F, G78, T8, G8F, TTF, GFP, AAG, ALT, BFL, TL, (T2+G23+T3+G34+T4+G45+T5)/G12, (T2+G23+T3+G34+T4+G45+T5)/(T1+G12), HFOV/BFL, HFOV/ALT, HFOV/TL, TTL/EFL, AAG/T1, AAG/T3, (T2+T4+G12+G34)/T1, (T5+G12+G23+G34)/(T1+T2), (T5+G12+G34+G45)/(T1+T4), (T2+T4+G12+G34)/T3, (T2+T4+G23+G34)/T3, (T2+T4+G34+G45)/T3, (G12+G23+T5)/(T2+G34), and (G12+G45+T5)/(T4+G34) of the present embodiment.

FIGS. 50A, 50B and 50C show the values of optical parameters of all embodiments, and it may be clear that the optical imaging lens of any one of the eleven embodiments may satisfy the Inequalities (1)-(20).

According to above disclosure, the longitudinal spherical aberration, the field curvature aberration and the variation of the distortion aberration of each embodiment may meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the field curvature aberration and/or the variation of the distortion aberration. Further, as shown by the imaging quality data provided for each embodiment, the distance between the 470 nm, 555 nm and 650 nm wavelengths may indicate that focusing ability and inhibiting ability for dispersion may be provided for different wavelengths.

While various embodiments in accordance with the disclosed principles are described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens comprising a first lens element, a second lens element, a third lens element, a fourth lens element and a fifth lens element sequentially from an object side to an image side along an optical axis, each of the first, second, third fourth and fifth lens elements having an object-side surface facing toward the object side and allowing imaging rays to pass through as well as an image-side surface facing toward the image side and allowing the imaging rays to pass through, wherein:
   the first lens element is arranged to be a lens element having refracting power in a first order from the object side to the image side and has positive refracting power;
   the second lens element is arranged to be a lens element having refracting power in a second order from the object side to the image side;
   a periphery region of the image-side surface of the second lens element is concave;

the third lens element is arranged to be a lens element having refracting power in a third order from the object side to the image side;

the fourth lens element is arranged to be a lens element having refracting power in a fourth order from the object side to the image side;

the fifth lens element is arranged to be a lens element having refracting power in a fifth order from the object side to the image side and has a positive refracting power;

a periphery region of the image-side surface of the fifth lens element is convex;

the optical imaging lens is a fixed-focus lens;

a thickness of the first lens element along the optical axis is represented by T1;

a thickness of the second lens element along the optical axis is represented by T2;

a thickness of the third lens element along the optical axis is represented by T3;

a thickness of the fourth lens element along the optical axis is represented by T4;

a thickness of the fifth lens element along the optical axis is represented by T5;

a distance from the image-side surface of the first lens element to the object-side surface of the second lens element along the optical axis is represented by G12;

a distance from the image-side surface of the second lens element to the object-side surface of the third lens element along the optical axis is represented by G23;

a distance from the image-side surface of the third lens element to the object-side surface of the fourth lens element along the optical axis is represented by G34;

a distance from the image-side surface of the fourth lens element to the object-side surface of the fifth lens element along the optical axis is represented by G45; and the optical imaging lens satisfies inequalities: $(T2+G23+T3+G34+T4+G45+T5)/G12 \leq 2.700$ and $(T5+G12+G34+G45)/(T1+T4) \leq 2.200$.

2. The optical imaging lens according to claim 1, wherein an Abbe number of the first lens element is represented by V1, an Abbe number of the second lens element is represented by V2, an Abbe number of the fifth lens element is represented by V5, and the optical imaging lens further satisfies an inequality: $V1 > V2+V5$.

3. The optical imaging lens according to claim 1, wherein a half field of view of the optical imaging lens is represented by HFOV, a distance from the image-side surface of the fifth lens element to an image plane along the optical axis is represented by BFL, and the optical imaging lens further satisfies an inequality: $HFOV/BFL \leq 4.400°/mm$.

4. The optical imaging lens according to claim 1, wherein a distance from the object-side surface of the first lens element to an image plane along the optical axis is represented by TTL, an effective focal length of the optical imaging lens is represented by EFL, and the optical imaging lens further satisfies an inequality: $TTL/EFL \leq 0.950$.

5. The optical imaging lens according to claim 1, wherein the optical imaging lens further satisfies an inequality: $(T2+T4+G12+G34)/T1 \leq 3.200$.

6. The optical imaging lens according to claim 1, wherein the optical imaging lens further satisfies an inequality: $(T2+T4+G12+G34)/T3 \leq 3.600$.

7. The optical imaging lens according to claim 1, wherein the optical imaging lens further satisfies an inequality: $(G12+G23+T5)/(T2+G34) \leq 3.700$.

8. An optical imaging lens comprising a first lens element, a second lens element, a third lens element, a fourth lens element and a fifth lens element sequentially from an object side to an image side along an optical axis, each of the first, second, third fourth and fifth lens elements having an object-side surface facing toward the object side and allowing imaging rays to pass through as well as an image-side surface facing toward the image side and allowing the imaging rays to pass through, wherein:

the first lens element is arranged to be a lens element having refracting power in a first order from the object side to the image side and has positive refracting power;

the second lens element is arranged to be a lens element having refracting power in a second order from the object side to the image side;

the third lens element is arranged to be a lens element having refracting power in a third order from the object side to the image side;

the fourth lens element is arranged to be a lens element having refracting power in a fourth order from the object side to the image side;

the fifth lens element is arranged to be a lens element having refracting power in a fifth order from the object side to the image side and has a positive refracting power;

a periphery region of the image-side surface of the fifth lens element is convex;

the optical imaging lens is a fixed-focus lens;

a thickness of the second lens element along the optical axis is represented by T2;

a thickness of the third lens element along the optical axis is represented by T3;

a thickness of the fourth lens element along the optical axis is represented by T4;

a thickness of the fifth lens element along the optical axis is represented by T5;

a distance from the image-side surface of the first lens element to the object-side surface of the second lens element along the optical axis is represented by G12;

a distance from the image-side surface of the second lens element to the object-side surface of the third lens element along the optical axis is represented by G23;

a distance from the image-side surface of the third lens element to the object-side surface of the fourth lens element along the optical axis is represented by G34;

a distance from the image-side surface of the fourth lens element to the object-side surface of the fifth lens element along the optical axis is represented by G45;

a half field of view of the optical imaging lens is represented by HFOV;

a F-number of the optical imaging lens is represented by Fno; and the optical imaging lens satisfies inequalities: $(T2+G23+T3+G34+T4+G45+T5)/G12 \leq 2.700$ and $HFOV/Fno \leq 4.200°$.

9. The optical imaging lens according to claim 8, wherein an Abbe number of the second lens element is represented by V2, an Abbe number of the third lens element is represented by V3, an Abbe number of the fifth lens element is represented by V5, and the optical imaging lens further satisfies an inequality: $V3 > V2+V5$.

10. The optical imaging lens according to claim 8, wherein a sum of the thicknesses of five lens elements from the first lens element to the fifth lens element along the optical axis is represented by ALT, and the optical imaging lens further satisfies an inequality: $HFOV/ALT \leq 3.300°/mm$.

11. The optical imaging lens according to claim 8, wherein a thickness of the first lens element along the optical axis is represented by T1, and a sum of four air gaps from the first lens element to the fifth lens element along the optical axis is represented by AAG, and the optical imaging lens further satisfies an inequality: AAG/T1≤2.100.

12. The optical imaging lens according to claim 8, wherein a thickness of the first lens element along the optical axis is represented by T1, and the optical imaging lens further satisfies an inequality: (T5+G12+G23+G34)/(T1+T2)≤1.800.

13. The optical imaging lens according to claim 8, wherein the optical imaging lens further satisfies an inequality: (T2+T4+G23+G34)/T3≤1.480.

14. The optical imaging lens according to claim 8, wherein the optical imaging lens further satisfies an inequality: (G12+G45+T5)/(T4+G34)≤3.200.

15. An optical imaging lens comprising a first lens element, a second lens element, a third lens element, a fourth lens element and a fifth lens element sequentially from an object side to an image side along an optical axis, each of the first, second, third fourth and fifth lens elements having an object-side surface facing toward the object side and allowing imaging rays to pass through as well as an image-side surface facing toward the image side and allowing the imaging rays to pass through, wherein:
   the first lens element is arranged to be a lens element having refracting power in a first order from the object side to the image side and has positive refracting power;
   the second lens element is arranged to be a lens element having refracting power in a second order from the object side to the image side;
   the third lens element is arranged to be a lens element having refracting power in a third order from the object side to the image side;
   the fourth lens element is arranged to be a lens element having refracting power in a fourth order from the object side to the image side;
   the fifth lens element is arranged to be a lens element having refracting power in a fifth order from the object side to the image side and has a positive refracting power;
   a periphery region of the image-side surface of the fifth lens element is convex;
   the optical imaging lens is a fixed-focus lens;
   a thickness of the first lens element along the optical axis is represented by T1
   a thickness of the second lens element along the optical axis is represented by T2;
   a thickness of the third lens element along the optical axis is represented by T3;
   a thickness of the fourth lens element along the optical axis is represented by T4;
   a thickness of the fifth lens element along the optical axis is represented by T5;
   a distance from the image-side surface of the first lens element to the object-side surface of the second lens element along the optical axis is represented by G12;
   a distance from the image-side surface of the second lens element to the object-side surface of the third lens element along the optical axis is represented by G23;
   a distance from the image-side surface of the third lens element to the object-side surface of the fourth lens element along the optical axis is represented by G34;
   a distance from the image-side surface of the fourth lens element to the object-side surface of the fifth lens element along the optical axis is represented by G45;
   a half field of view of the optical imaging lens is represented by HFOV;
   a F-number of the optical imaging lens is represented by Fno; and
   the optical imaging lens satisfies inequalities: (T2+G23+T3+G34+T4+G45+T5)/(T1+G12)≤2.200 and HFOV/Fno≤4.200°.

16. The optical imaging lens according to claim 15, wherein an Abbe number of the second lens element is represented by V2, an Abbe number of the fourth lens element is represented by V4, an Abbe number of the fifth lens element is represented by V5, and the optical imaging lens further satisfies an inequality: V4>V2+V5.

17. The optical imaging lens according to claim 15, wherein a distance from the object-side surface of the first lens element to the image-side surface of the fifth lens element along the optical axis is represented by TL, and the optical imaging lens further satisfies an inequality: HFOV/TL≤2.500°/mm.

18. The optical imaging lens according to claim 15, wherein a sum of the four air gaps from the first lens element to the fifth lens element along the optical axis is represented by AAG, and the optical imaging lens further satisfies an inequality: AAG/T3≤3.500.

19. The optical imaging lens according to claim 15, wherein the optical imaging lens further satisfies an inequality: (T5+G12+G34+G45)/(T1+T4)≤2.200.

20. The optical imaging lens according to claim 15, wherein the optical imaging lens further satisfies an inequality: (T2+T4+G34+G45)/T3≤2.200.

* * * * *